(12) United States Patent
Ruopp

(10) Patent No.: US 9,731,789 B2
(45) Date of Patent: Aug. 15, 2017

(54) MASTER CYLINDER

(71) Applicant: Gustav Magenwirth GMBH & Co. KG, Bad Urach (DE)

(72) Inventor: Michael Ruopp, Berghülen (DE)

(73) Assignee: Gustav Magenwirth GmbH & Co., KG (DE)

( * ) Notice: Subject to any disclaimer, the term of this patent is extended or adjusted under 35 U.S.C. 154(b) by 251 days.

(21) Appl. No.: 14/467,759

(22) Filed: Aug. 25, 2014

(65) Prior Publication Data

US 2015/0000267 A1 Jan. 1, 2015

Related U.S. Application Data

(63) Continuation of application No. PCT/EP2013/054071, filed on Feb. 28, 2013.

(30) Foreign Application Priority Data

Mar. 1, 2012 (EP) .................................. 12157814.0

(51) Int. Cl.
| | |
|---|---|
| *B62L 3/02* | (2006.01) |
| *B60T 7/10* | (2006.01) |
| *B60T 11/16* | (2006.01) |
| *B60T 11/18* | (2006.01) |
| *B62K 23/06* | (2006.01) |
| *F16D 48/02* | (2006.01) |
| *B60T 11/22* | (2006.01) |
| *F16D 25/08* | (2006.01) |

(52) U.S. Cl.
CPC .............. *B62L 3/023* (2013.01); *B60T 7/102* (2013.01); *B60T 11/16* (2013.01); *B60T 11/165* (2013.01); *B60T 11/18* (2013.01); *B60T 11/22* (2013.01); *B62K 23/06* (2013.01); *F16D 48/02* (2013.01); *F16D 2025/081* (2013.01)

(58) Field of Classification Search
CPC ....................................................... B60T 7/102
USPC ................................................... 60/592, 586
See application file for complete search history.

(56) References Cited

U.S. PATENT DOCUMENTS

| | | | |
|---|---|---|---|
| 2010/0052415 A1* | 3/2010 | Vezzoli ................... | B60T 11/22 303/10 |
| 2013/0086900 A1* | 4/2013 | Kim ........................ | B60T 11/16 60/533 |

* cited by examiner

*Primary Examiner* — Thomas E Lazo
*Assistant Examiner* — Daniel Collins
(74) *Attorney, Agent, or Firm* — Mayback & Hoffman, P.A.; Gregory K. Mayback

(57) ABSTRACT

A master cylinder for a hydraulic brake system or clutch system, in particular of a vehicle steered by handlebars, in particular of a bicycle, includes a housing containing a piston chamber. The housing accommodates a piston slidable therein and a pressure chamber. A compensating chamber communicates with the pressure chamber through at least one compensating bore. The housing has an attachment portion for attachment to a handlebar tube and the compensating chamber extends to the attachment portion and has a separating member for separating the hydraulic fluid from a compensating volume. The attachment portion has a clamping part made and arranged to attach the separating member to the attachment portion.

20 Claims, 21 Drawing Sheets

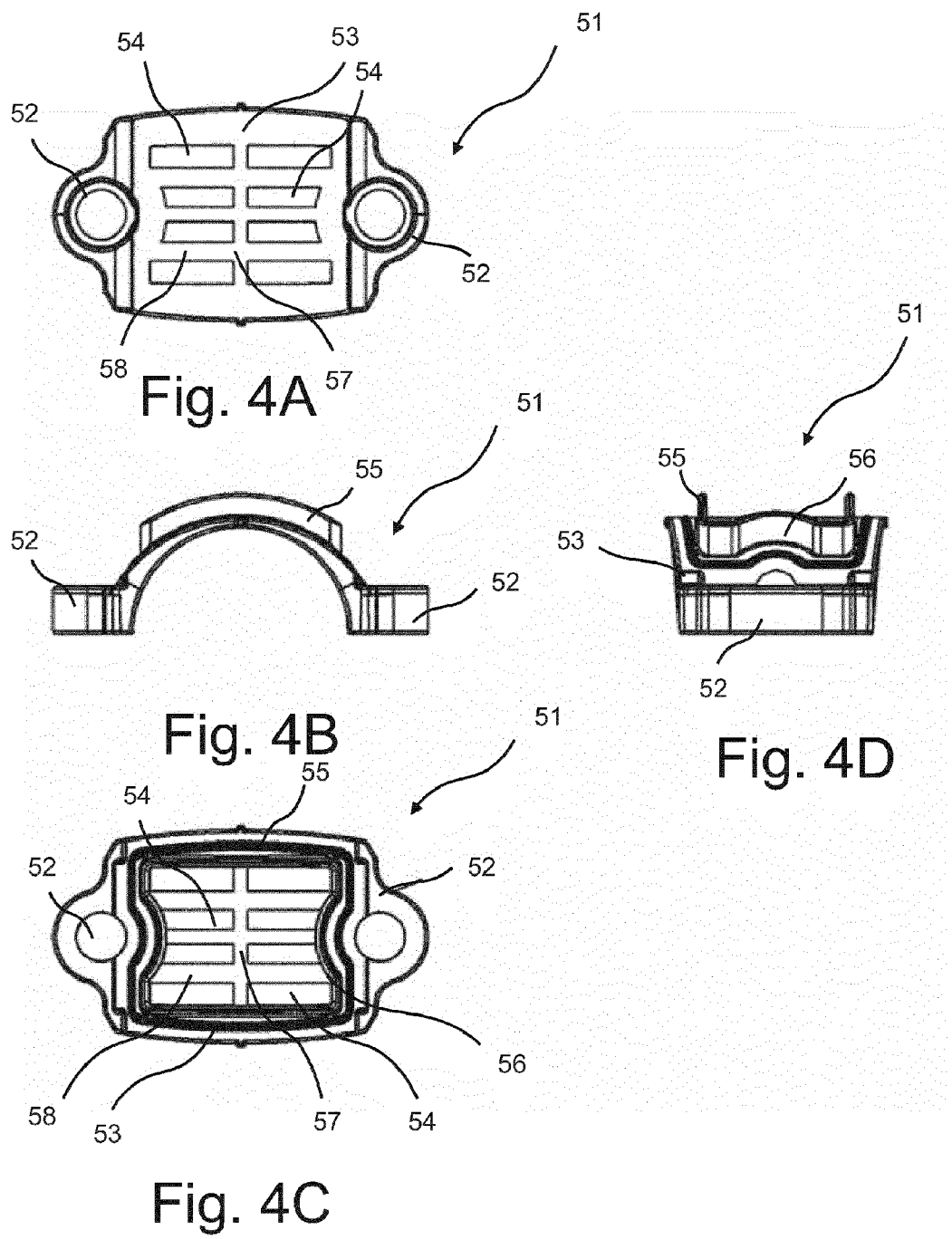

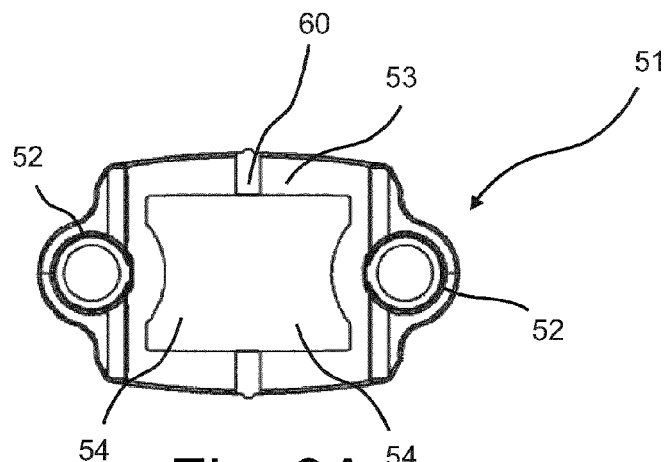
Fig. 9A
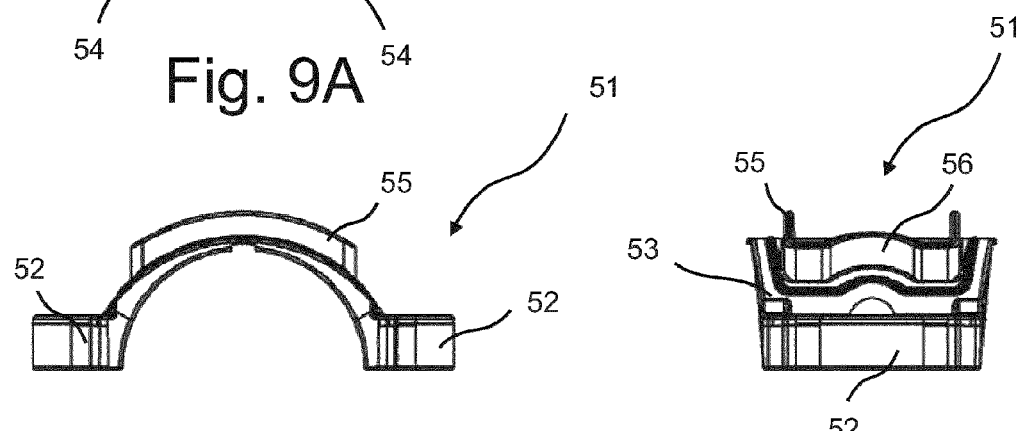
Fig. 9B
Fig. 9D
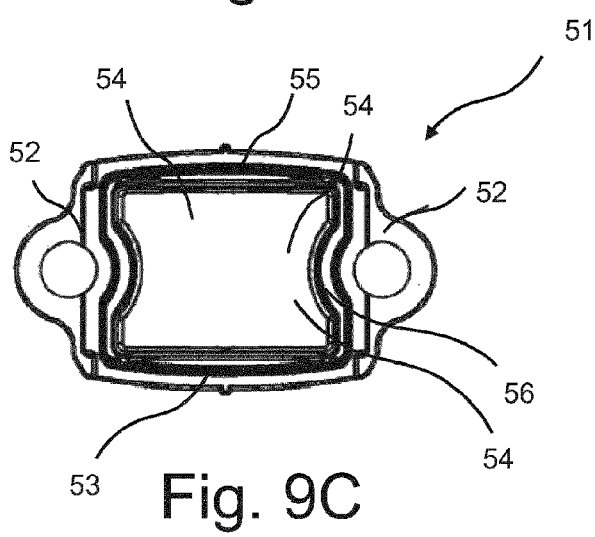
Fig. 9C

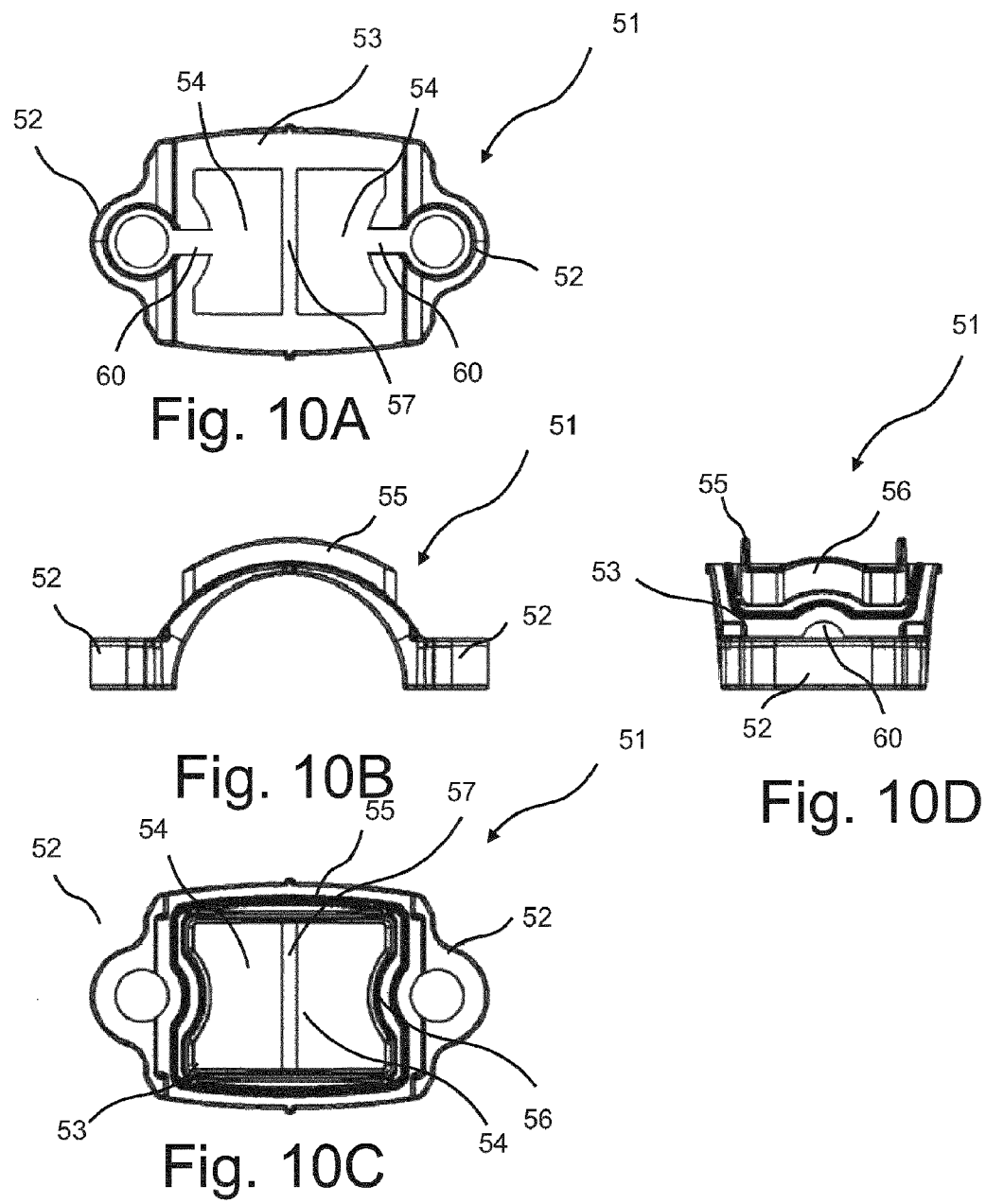

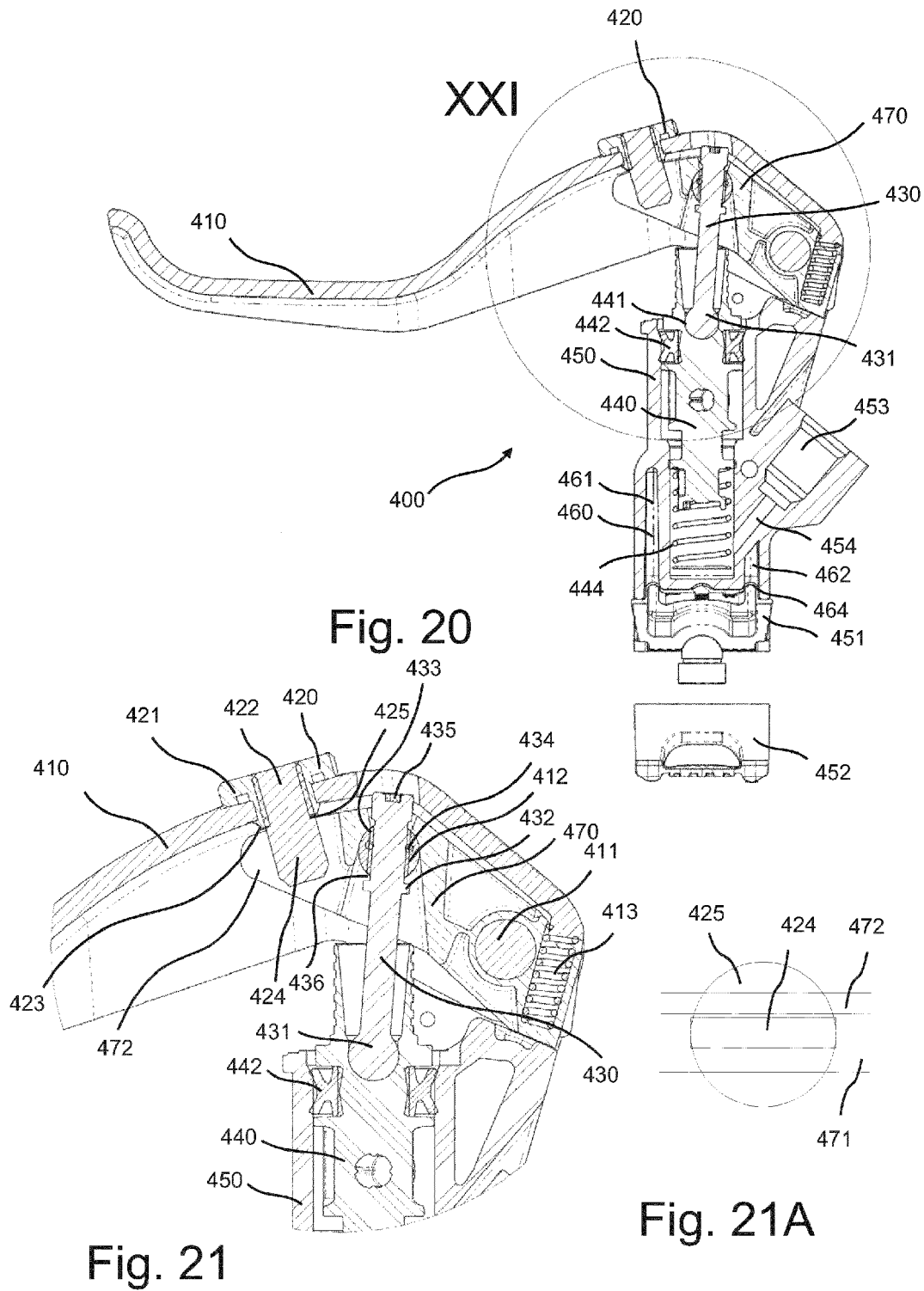

MASTER CYLINDER

CROSS-REFERENCE TO RELATED APPLICATIONS

This is a continuing application, under 35 U.S.C. §120, of copending international application No. PCT/EP2013/054071 filed on Feb. 28, 2013, which designated the United States and was not published in English; this application also claims the priority, under 35 U.S.C. §119, of European Application No. 12157814.0 filed on Mar. 1, 2012, the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention lies in the field of brakes. The present disclosure relates to a master cylinder, in particular to a master cylinder for a hydraulic brake system or a hydraulic clutch system of vehicles steered by handlebars and, further in particular, for a bicycle hydraulic brake system or a bicycle hydraulic disk brake.

SUMMARY OF THE INVENTION

The invention provides a master cylinder, for example, a master cylinder for a hydraulic brake system or a hydraulic clutch system of vehicles steered by handlebars and further in particular for a bicycle hydraulic brake system or a bicycle hydraulic disk brake that overcome the hereinafore-mentioned disadvantages of the heretofore-known devices and methods of this general type and that provide such features with high quality and low weight.

According to an exemplary embodiment of the invention, a master cylinder for a hydraulic brake system or clutch system, in particular, of a vehicle steered by handlebars, in particular, of a bicycle, is provided which comprises a housing containing a piston chamber, said housing accommodating a piston slidable therein and a pressure chamber, and a compensating chamber which communicates with the pressure chamber through at least one compensating bore, wherein the housing has an attachment portion for attachment to a handlebar tube, and the compensating chamber extends to the attachment portion and has a separating member for separating the hydraulic fluid from a compensating volume, wherein the attachment portion has a clamping part which is made and disposed so as to attach the separating member to the attachment portion.

According to an exemplary embodiment of the invention, a master cylinder for a hydraulic brake system or clutch system, in particular, of a vehicle steered by handlebars, in particular, of a bicycle, is provided which comprises a housing containing a piston chamber, said housing accommodating a piston slidable therein and a pressure chamber, and a compensating chamber which communicates with the pressure chamber through at least one compensating bore, wherein the housing has an attachment portion for attachment to a handlebar tube, and the compensating chamber extends to the attachment portion and has a separating member for separating the hydraulic fluid from a compensating volume, wherein the attachment portion and the separating member are configured and constructed so as to clamp the separating member, for example, by its edge, between the handlebar tube and the attachment portion when the master cylinder is attached to a handlebar tube.

According to an exemplary embodiment of the invention, a master cylinder for a hydraulic brake system or clutch system, in particular, of a vehicle steered by handlebars, in particular, of a bicycle, is provided which comprises a housing containing a piston chamber, said housing accommodating a piston slidable therein and a pressure chamber, and a compensating chamber which communicates with the pressure chamber through at least one compensating bore, wherein the housing has an attachment portion for attachment to a handlebar tube, and the compensating chamber extends to the attachment portion and has a separating member for separating the hydraulic fluid from a compensating volume, wherein the separating member is a gas-filled body and/or a compressible body and/or a resiliently deformable body which is disposed in the compensating chamber and/or at a handlebar tube.

For example, the body in the compensating chamber can be made of a resilient material and/or rubber. Alternatively or additionally, the body can be sponge-like to be able to compensate for a change in the amount of hydraulic fluid in the compensating chamber.

These exemplary embodiments of the invention have the advantage that a separating member might possibly be omitted and/or less space is required as a volume compensation for the separating member.

According to an exemplary embodiment of the invention, a master cylinder for a hydraulic brake system or clutch system, in particular, of a vehicle steered by handlebars, in particular, of a bicycle, is provided which comprises a housing containing a piston chamber, said housing accommodating a piston slidable therein and a pressure chamber, and a compensating chamber which communicates with the pressure chamber through at least one compensating bore, wherein the housing has an attachment portion for attachment to a handlebar tube, and the compensating chamber extends to the attachment portion and has a separating member for separating the hydraulic fluid from a compensating volume, wherein the compensating chamber extends into the handlebar tube in the case of a master cylinder attached to a handlebar tube, wherein the separating member is disposed in an opening in the handlebar tube and/or extends into the handlebar tube.

According to an exemplary embodiment of the invention, the attachment portion can have a clamping part which is made and configured to attach the separating member to the attachment portion, and/or the attachment portion and the separating member can be disposed and constructed to clamp the separating member, for example, by its edge, between the handlebar tube and the attachment portion when the master cylinder is attached to a handlebar tube, and/or the separating member can be a gas-filled body and/or a compressible body and/or a resiliently deformable body and/or a compressible body and/or a resiliently deformable body which is disposed in the compensating chamber and/or at a handlebar tube, and/or the compensating chamber can extend into the handlebar tube in the case of a master cylinder attached to a handlebar tube, wherein the separating member is disposed in an opening in the handlebar tube and/or extends into the handlebar tube.

According to an exemplary embodiment of the invention, the separating member can be configured to close a hole in a handlebar tube where the master cylinder is attached. The advantage is that the separating part can escape into the handlebar tube in the case of the volume fluctuations to be compensated for. This results in a particular compact configuration that is accompanied by a corresponding weight saving.

According to an exemplary embodiment of the invention, the clamping part can be made as a frame and/or the separating member as a bellows, wherein the clamping part has at least one or more ridges.

In exemplary embodiments having several ridges, the latter can be disposed in parallel and/or transversely to one another. The ridges can also be configured as grates or in such a way that a hole pattern results.

According to an exemplary embodiment of the invention, the clamping part can have a sieve-like shape.

According to an exemplary embodiment of the invention, the clamping part can have at least one or more ventilation channels.

According to an exemplary embodiment of the invention, the separating member and/or the bellows and the clamping part and/or the frame can be connected to one another by a snap fit.

According to an exemplary embodiment of the invention, the edge portion of the separating member can be reinforced. The reinforcement can be achieved by an insert and/or a material reinforcement, for example. In these embodiments, the separating member can be adhered to or plugged onto the housing, for example, and be clamped additionally between the handlebar tube and the housing when the housing is attached to the handlebar tube.

According to an exemplary embodiment of the invention, the clamping part can be made as a frame that has discontinuities at the circumference thereof. In the case of several discontinuities, the clamping part advantageously has at least one ridge that connects the frame parts to one another. If embodiments have only one discontinuity, the connecting ridge is dispensable.

In the exemplary embodiments according to the invention in which the clamping part has at least one or more large openings, an advantage is provided in that the separating member can move up to the handlebar tube. As a result, a substantially more compact configuration can be achieved and, therefore, the master cylinder can be lighter.

In the exemplary embodiments according to the invention in which the compensating chamber and/or the separating part extend into the handlebar tube, an extremely compact configuration can also be achieved, which is accompanied by a major weight saving.

According to an exemplary embodiment of the invention, the separating member can be fixed or disposed or adapted to be disposed by a handlebar tube and a clamp at the housing of the master cylinder.

According to an exemplary embodiment of the invention, the separating member can be clamped by the handlebar tube and/or a clamp.

According to an exemplary embodiment of the invention, the separating member can be clamped by a frame that is attached to the housing of the master cylinder. According to the invention, these exemplary embodiments do not have to comprise a cover that closes the compensating chamber. The compensating chamber and the separating member can be protected from damage by the handlebar tube that impairs or prevents an access to the separating member from outside (apart from possible ventilation channels).

According to an exemplary embodiment of the invention, the clamping part can be attached to the housing of the master cylinder by screws. Here, the separating member can be clamped between the housing and the clamping part.

According to an exemplary embodiment of the invention, the master cylinder can also have a counterpart for attaching the master cylinder to a handlebar tube and at least one connecting device for connecting the counterpart to the housing of the master cylinder. Here, the at least one connecting device can have a first connecting portion to connect the clamping part to the housing of the master cylinder and a second connecting portion to connect the counterpart to the master cylinder and to attach the master cylinder to a handlebar tube, and a collar can also be provided between the first connecting portion and the second connecting portion of the at least one connecting device.

According to an exemplary embodiment of the invention, the master cylinder can have at least one connecting device for connecting the counterpart to the housing of the master cylinder, wherein the at least one connecting device has a first connecting portion to connect the clamping part to the housing of the master cylinder and a second connecting portion to connect the counterpart to the master cylinder and to attach the master cylinder to a handlebar tube. Such an embodiment has the advantage that, initially, the clamping part can be safely attached to the housing due to the dual function of the connecting device and, then, the counterpart can be connected to the housing of the master cylinder to attach the master cylinder to a handlebar tube that is disposed between the clamping part and the counterpart.

According to an exemplary embodiment of the invention, a collar can be provided between the first connecting portion and the second connecting portion of the at least one connecting device. This embodiment has the advantage that the clamping part can be pressed firmly against the housing when the at least one connecting device is attached to the housing of the master cylinder.

According to an exemplary embodiment of the invention, a stop can be provided at the clamping part, wherein the collar hits the stop or supports itself on the stop to prevent a further penetration of the at least one connecting device into the housing when the clamping part is connected to the housing in sufficiently firm fashion.

According to an exemplary embodiment of the invention, the connecting device and/or the collar can be made such that the collar presses the clamping part against the housing when the at least one connecting device is attached to the housing, thus establishing a connection thereto. A separating member can be provided between the clamping part and the housing and can be made by the edge of a bellows.

According to an exemplary embodiment of the invention, at least two connecting devices can be provided that are disposed over the circumference of the clamping part in even distribution.

According to an exemplary embodiment of the invention, a joint can be provided opposite to the at least one connecting devices, wherein the counterpart is made such that it can be pivoted to the joint and can be connected to the master cylinder via the opposite side, wherein the handlebar tube is clamped between the clamping part and the counterpart to attach the master cylinder to the handlebar tube.

According to an exemplary embodiment of the invention, the at least one connecting device or the connecting devices can comprise a stud According to an exemplary embodiment of the invention, the at least one connecting device or the connecting devices can comprise a first threaded portion to attach the stud in the housing. Alternatively or additionally, the connecting device can also be connected to the housing in another or additional way. For example, a press fit can be provided with which the connecting device is attached in the housing, thus fixing the clamping part to the housing of the master cylinder. The clamping part is, here, pressed against the housing by a collar.

According to an exemplary embodiment of the invention, the first connecting portion can have a plug device that can be screwed or pressed into a corresponding recess of the housing, and/or a portion provided with a recess with which a corresponding portion of the housing can mesh to connect the first connecting portion to the housing and force the clamping part against the housing. The clamping part has an opening or a bore through which the first connecting portion is guided when the clamping part is attached to the housing of the master cylinder.

According to an exemplary embodiment of the invention, the first threaded portion can have a bolt-like and/or screw-like projection or portion that can mesh with or can be screwed in or be forced into a corresponding support in the housing to attach the connecting device and the clamping part to the housing of the master cylinder.

Alternatively or additionally, the first threaded portion can have, according to an exemplary embodiment of the invention, a nut-like projection that can mesh with or can be screwed in or can be pressed into a corresponding support in the housing to attach the connecting device and the clamping part to the housing of the master cylinder.

According to an exemplary embodiment of the invention, the second threaded portion can have a bolt-like and/or screw-like projection for the attachment of a connecting device to attach the counterpart to the clamping part and/or with the housing to the handlebar tube, wherein a nut-like attachment can be connected to the projection for the attachment of the counterpart.

Alternatively or additionally, the second threaded portion can have, according to an exemplary embodiment of the invention, a nut-like projection for the attachment of a connecting device to attach the counterpart to the clamping part and/or with the housing to the handlebar tube, wherein a bolt-like and/or screw-like attachment can be connected to the projection for the attachment of the counterpart.

According to an exemplary embodiment of the invention, the at least one connecting device can have a special tool engagement, wherein, by a special tool, the at least one connecting device can be mounted on the housing and, in doing so, the clamping part can be connected to the housing. This embodiment has the advantage that the user cannot open the master cylinder, which ensures a reliable operation.

According to an exemplary embodiment of the invention, at least one further compensating bore can be provided that connects the pressure chamber to the compensating chamber and/or the compensating chamber can be provided between the cylindrical wall of the piston chamber and the housing wall of the master cylinder housing receiving the piston chamber and/or at least one ridge and/or one rib can be provided between the cylindrical wall confining the piston chamber and a wall defining the compensating chamber (which can be, in particular, a wall of the housing of the master cylinder), said rib connecting the compensating chamber wall to the piston chamber wall and/or the compensating chamber can at least partially enclose the cylindrical wall of the piston chamber and/or the compensating chamber can be divided in at least two sectors that are disposed laterally from the cylindrical wall confining the piston chamber.

These embodiments of the invention have the advantage that the master cylinder can be configured in an extremely compact manner with the compensating chamber, wherein a sufficient volume for the compensating chamber is simultaneously provided. In addition, sufficient stability is provided. For example, the compensating chamber can enclose at least 90° of the piston chamber, more preferably at least 120°, more preferably at least 150°, more preferably at least 180°, more preferably at least 210°, more preferably at least 240°, more preferably at least 270°, more preferably at least 300°, more preferably at least 330° and, preferably, the entire circumference of the piston chamber.

The term cylindrical wall confining the piston chamber is to be comprehended in connection with the present industrial property right such that it refers to the inner side of the wall that defines the piston chamber and along which a piston glides upon actuation of the master cylinder, which is usually sealed by a gasket.

The outer side of the cylindrical wall confining the piston chamber can, of course, also have an uneven shape. The outer wall is, advantageously, also substantially cylindrical so as to have the greatest possible volume available for the compensating chamber.

A connection between the compensating chamber and the pressure chamber through the compensating bores takes place as long as the gasket of the piston has not traveled over the compensating bores. The compensating bore openings that open into the piston chamber are advantageously disposed at least approximately at the same site, based on the direction of movement of the piston, in order for the piston to travel over the openings of the compensating bores at the same time.

According to an exemplary embodiment of the invention, the compensation chamber can be divided into three sectors by at least two ridges. For example, the sectors can be evenly distributed about the cylindrical wall of the piston chamber and, therefore, each has a sector of 120°, for example. It is evident that some degrees which result from the thickness of the ridge confining the sector have to be deducted from the 120°.

According to an exemplary embodiment of the invention, the compensating chamber can be divided into four sectors each having approximately 90° and being divided at least in the lower region by four ridges uniformly disposed about the circumference of the piston chamber.

According to an exemplary embodiment of the invention, the individual sectors of the compensating chamber can be connected to one another above the ridges dividing the compensating chamber into sectors. The advantage here is that the compensating chamber sectors can be sealed by a single bellows.

According to an exemplary embodiment of the invention, the master cylinder can have an adjusting apparatus for adjusting the handle width and the pressure point, wherein the adjusting apparatus has an actuation element with which the handle width can be adjusted in a first position and the pressure point can be adjusted in a second position.

The master cylinder embodiment according to the invention has the advantage that, as a result of the dual function of the actuation element, the adjusting apparatus can be made very compact and small. This serves for saving weight and costs. In addition, the adjustment is very simple.

According to an exemplary embodiment of the invention, the actuation element can be biased by a spring apparatus into the first position for adjusting the handle width and/or into the second position for adjusting the pressure point. According to an exemplary embodiment of the invention, the adjusting apparatus can be made such that, in the adjustment, the actuation element can be engaged with a locking sleeve that surrounds a second member that can mesh with the actuation element in the other position. This embodiment of the invention has the advantage of an extremely compact design having the associated low weight.

According to an exemplary embodiment of the invention, the actuation element can be a turning knob that, in the first position, is fixed to a first adjusting member for rotation therewith and, in a second position, is connected to a second adjusting member for rotation therewith.

According to an exemplary embodiment of the invention, the actuation element can be changed from the first position into the second position by pushing the actuation element.

According to an exemplary embodiment of the invention, the actuation element can be turned for adjustment in the first position and/or in the second position in order to turn the adjusting element connected to the actuation element for rotation therewith.

According to an exemplary embodiment of the invention, the master cylinder can have an adjusting apparatus to adjust the handle width by changing the angle between the lever and the pressure piece, wherein the adjusting apparatus supports itself on the pressure piece, wherein the adjusting apparatus has a spacer that supports itself on the pressure piece and that is secured against a twist by the pressure piece. This embodiment of the invention has the advantage of a compact design that provides for low weight and low cost.

According to an exemplary embodiment of the invention, the spacer can have a projection that is disposed between a region of the pressure piece, said region having substantially the shape of a fork and/or being disposed between two projections of the pressure piece such that the spacer is secured against twist.

According to an exemplary embodiment of the invention, the spacer can have a point or flange that extends laterally away from the spacer and supports itself on the pressure piece.

In this connection, lateral signifies perpendicular to the plane in which the lever and the pressure piece are pivoted or turned upon actuation of the master cylinder.

According to an exemplary embodiment of the invention, the master cylinder can have a pressure point adjusting apparatus, wherein the pressure point adjusting apparatus is disposed and configured to adjust the limit stop of the piston on the housing.

According to an exemplary embodiment of the invention, the adjusting apparatus can have a stop member that is rotationally fixed to the housing and that is disposed to be axially slidable relative to the housing and/or the adjusting apparatus can have an adjusting member that is disposed to be rotatable relative to the cylinder housing, and its movement is limited in an axial direction based on the cylinder.

According to an exemplary embodiment of the invention, the adjusting member can be limited in an axial direction by a pin that is supported in the housing.

According to an exemplary embodiment of the invention, the master cylinder can have a lever and a cylinder housing in which a piston is slidably disposed, wherein the piston is secured against rotation within the cylinder housing, and the piston position detection device has a signal member disposed asymmetrically based on the circumference of the piston and a detection member assigned, and/or disposed opposite, to the signal member.

According to an exemplary embodiment of the invention, the signal member can be a bar magnet and a detection element can be a Hall sensor. This embodiment of the invention has the advantage that the piston position detection device can be made in a simple and cost-effective manner. It is, in particular, not necessary to provide a configuration symmetric based on the circumference of the piston and the housing to only obtain a proper detection of the position in an axial direction of the piston even if the piston is turned within the housing.

According to an exemplary embodiment of the invention, the master cylinders can be used for hydraulic brakes or clutches or can be a part thereof. In particular, the master cylinders can be parts of hydraulic disk brakes or rim brakes of bicycles or other vehicles steered by handlebars or can be used for said purpose.

According to an exemplary embodiment of the invention, the material of the housing of the master cylinder and/or the brake caliper can include die cast metal and/or a fiber-reinforced plastic material, in particular, a carbon fiber-reinforced plastic material, e.g., a thermosetting material and/or a thermoplastic material.

Although the invention is illustrated and described herein as embodied in a master cylinder, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 4A is a bottom plan view of a clamping part of a master cylinder according to an embodiment of the invention (i.e., from the direction of the handlebar tube to which the master cylinder has to be attached);

FIG. 4B is a side elevational view of the clamping part of FIG. 4A;

FIG. 4C is a top plan view of the clamping part of FIG. 4A;

FIG. 4D is a side elevational view of the clamping part of FIG. 4A;

FIG. 9A is a bottom plan view of a clamping part of a master cylinder according to an embodiment of the invention (i.e., from the direction of the handlebar tube to which the master cylinder has to be attached);

FIG. 9B is a side elevational view of the clamping part of FIG. 9A;

FIG. 9C is a top plan view of the clamping part of FIG. 9A;

FIG. 9D is a side elevational view of the clamping part of FIG. 9A;

FIG. 10A is a bottom plan view of a clamping part of a master cylinder according to an embodiment of the invention (i.e., from the direction of the handlebar tube to which the master cylinder has to be attached);

FIG. 10B is a side elevational view of the clamping part of FIG. 10A;

FIG. 10C is a top plan view of the clamping part of FIG. 10A;

FIG. 10D is a side elevational view of the clamping part of FIG. 10A;

FIG. 20 is a cross-sectional view of a master cylinder according to a further exemplary embodiment of the invention for a hydraulic disk brake;

FIG. 21 is a fragmentary, cross-sectional view of the master cylinder of FIG. 20 within the range of the circle XXI;

FIG. 21A is a fragmentary, enlarged view of the adjusting member and of the pressure piece of the master cylinder of FIG. 20 from the direction of the piston, wherein the other parts are omitted for the sake of overview;

DETAILED DESCRIPTION OF THE INVENTION

Figure 1A:
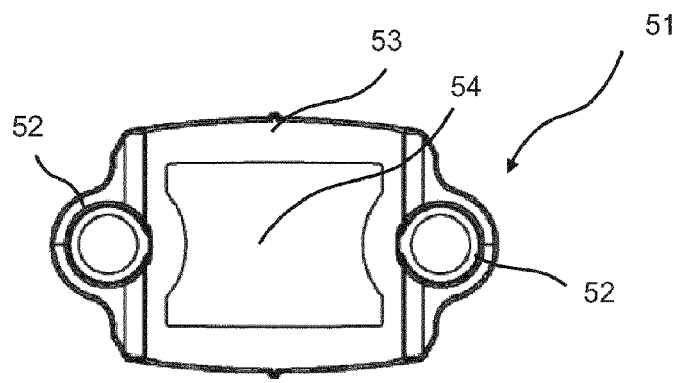
FIG. 1A is a bottom plan view of a clamping part of a master cylinder according to an exemplary embodiment of the invention (i.e., from the direction of the handlebar tube to which the master cylinder is attached)
Figure 1B:
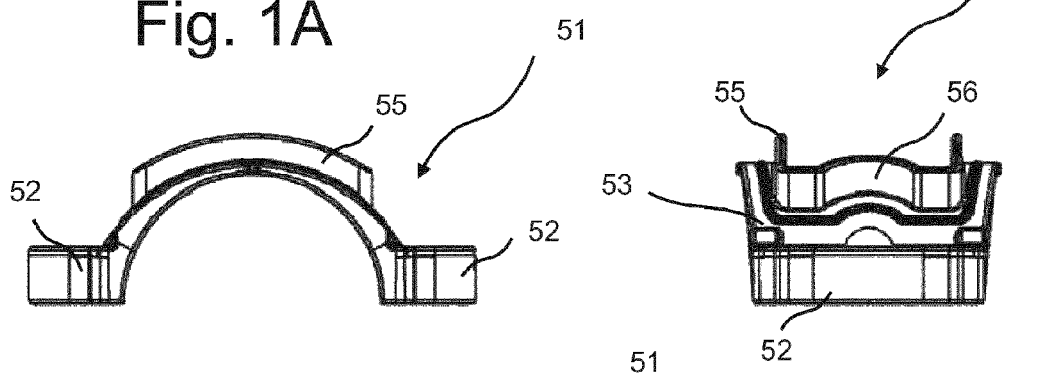
FIG. 1B is a side elevational view of the clamping part of FIG. 1A.
Figure 1D:
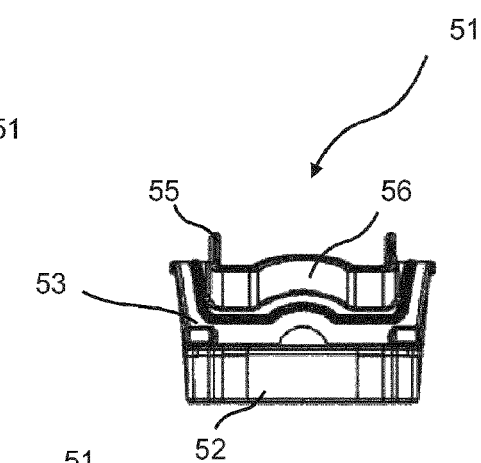
FIG. 1D is a side elevational view of the clamping part of FIG. 1A.
Figure 1C:
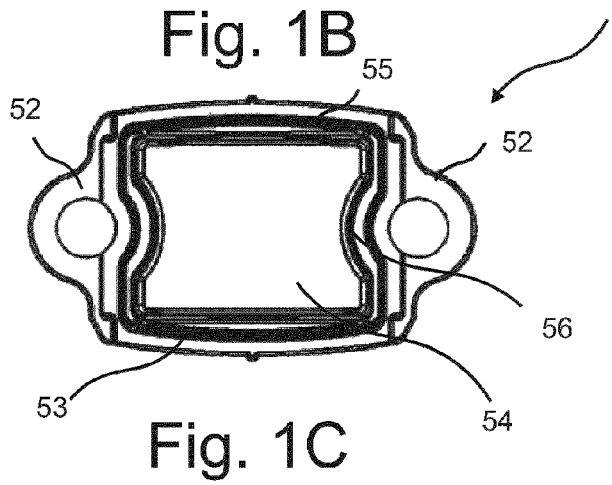
FIG. 1C is top plan view of the clamping part of FIG. 1A.
Figure 2A:
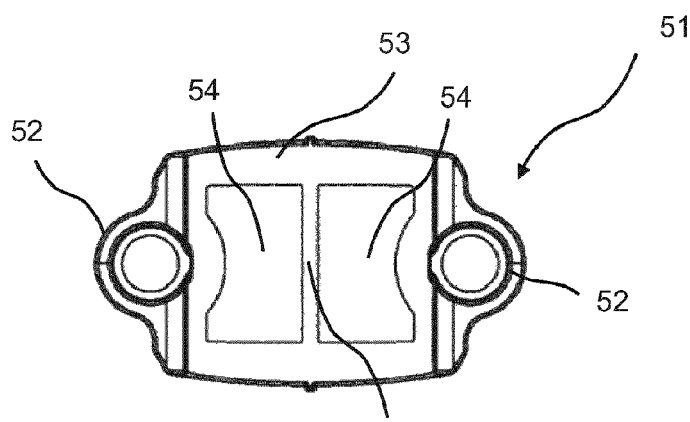
FIG. 2A is a bottom view of a clamping part of a master cylinder according to an exemplary embodiment of the invention (i.e., from the direction of the handlebar tube to which the master cylinder has to be attached)
Figure 2B:
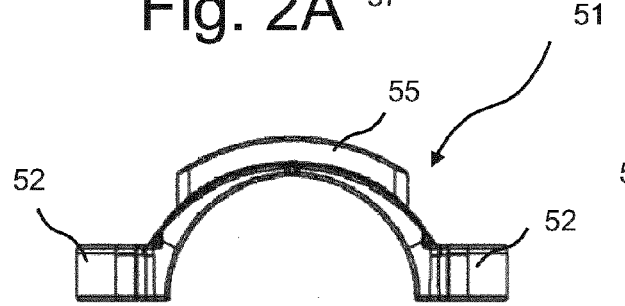
FIG. 2B is a side elevational view of the clamping part of FIG. 2A.
Figure 2D:
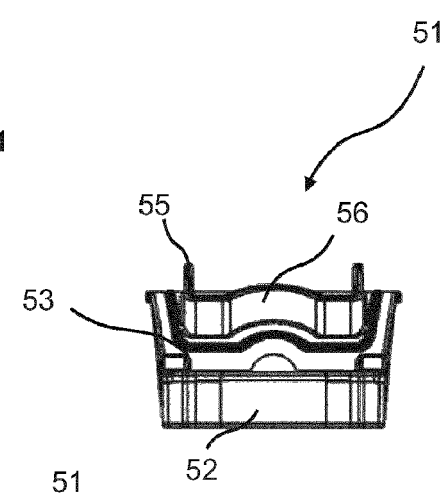
FIG. 2D is a side elevational view of the clamping part of FIG. 2A.
Figure 2C:
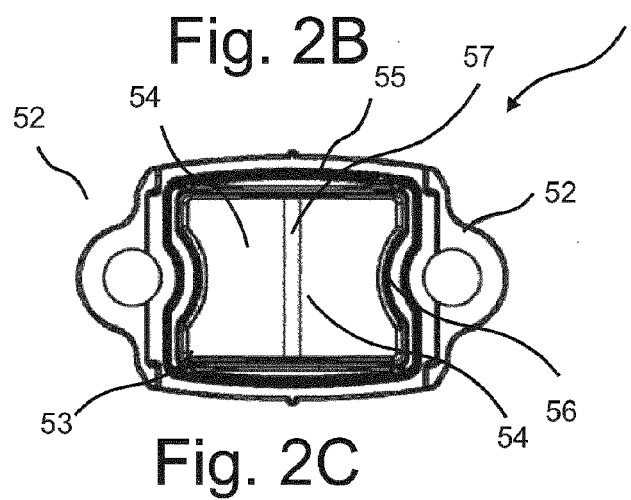
FIG. 2C is a top plan view of the clamping part of FIG. 2A.
Figure 3A:
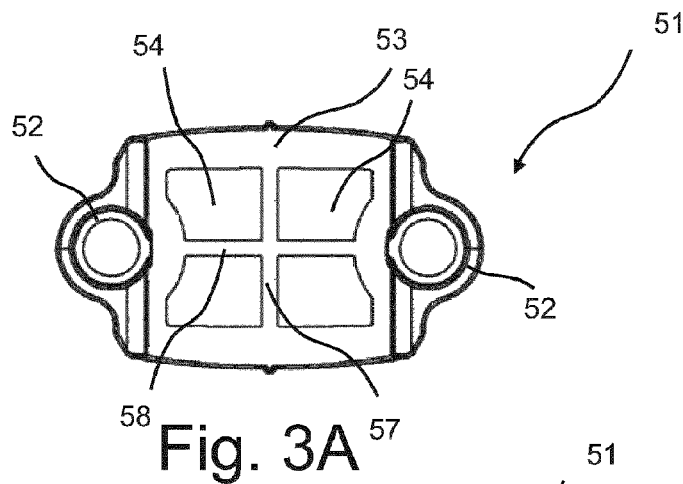
FIG. 3A is a bottom plan view of a clamping part of a master cylinder according to an embodiment of the invention (i.e., from the direction of the handlebar tube to which the master cylinder has to be attached)
Figure 3B:
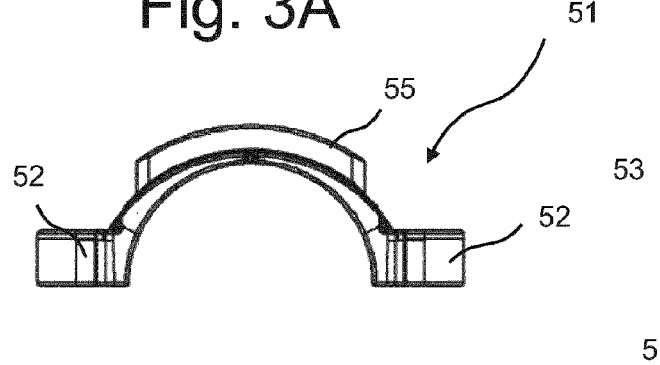
FIG. 3B is a side elevational view of the clamping part of FIG. 3A.
Figure 3D:
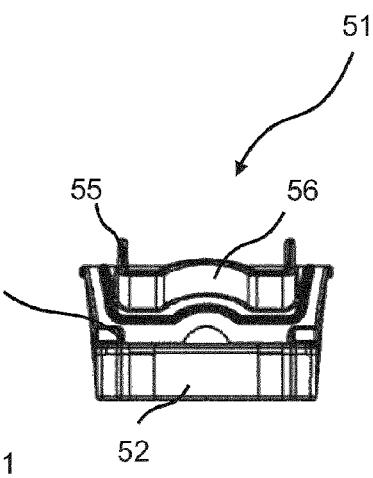
FIG. 3D is a side elevational view of the clamping part of FIG. 3A.
Figure 3C:
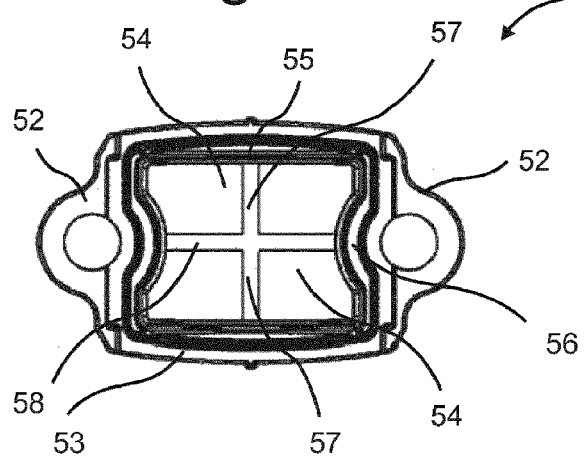
FIG. 3C is a top plan view of the clamping part of FIG. 3A.
Figure 5A:
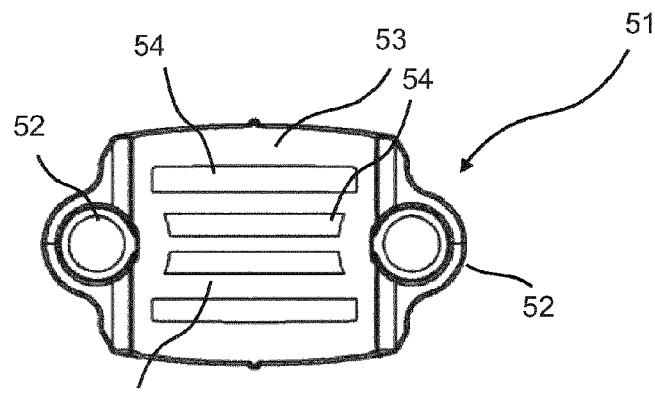
FIG. 5A is a bottom plan view of the clamping part of a master cylinder according to an embodiment of the invention from below (i.e., from the direction of the handlebar tube to which the master cylinder has to be attached)
Figure 5B:
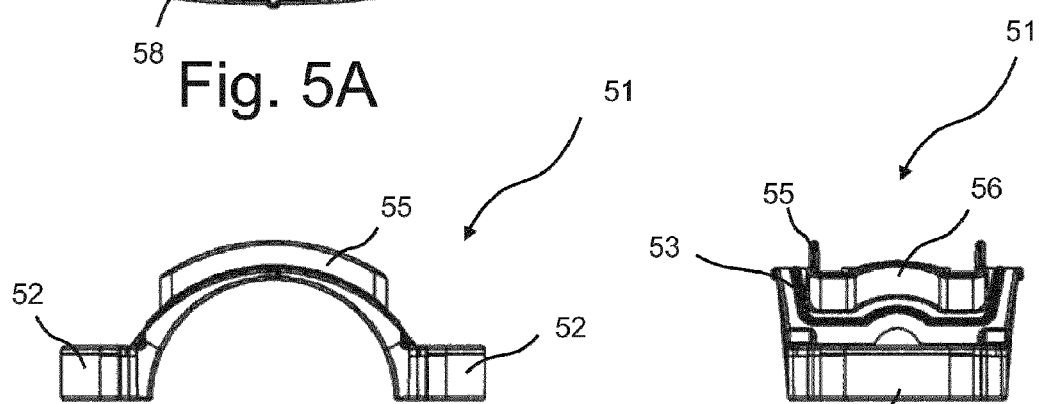
FIG. 5B is a side elevational view of the clamping part of FIG. 5A.
Figure 5D:
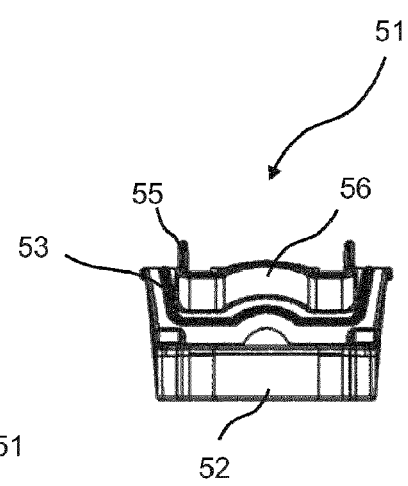
FIG. 5D is a side elevational view of the clamping part of FIG. 5A.
Figure 5C:
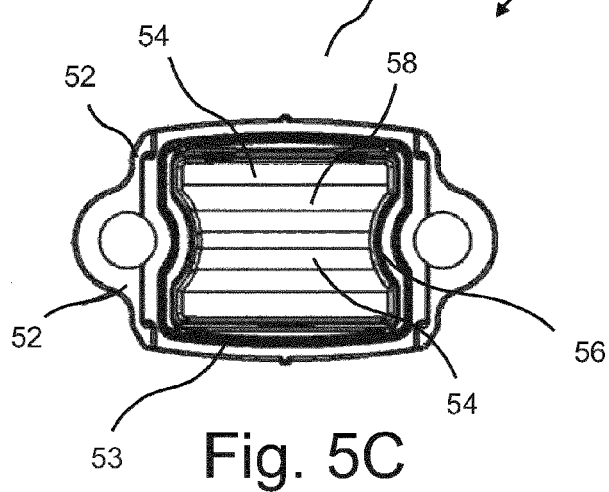
FIG. 5C is a top plan view of the clamping part of FIG. 5A.
Figure 6A:
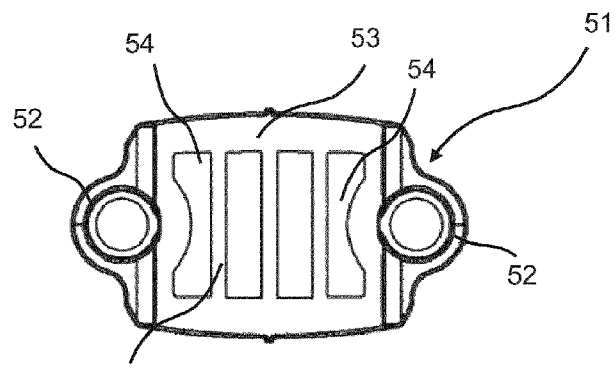
FIG. 6A is a bottom plan view of a clamping part of a master cylinder according to an embodiment of the invention (i.e., from the direction of the handlebar tube to which the master cylinder has to be attached)
Figure 6B:
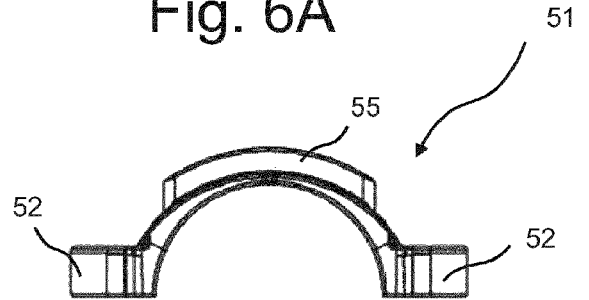
FIG. 6B is a side elevational view of the clamping part of FIG. 6A.
Figure 6D:
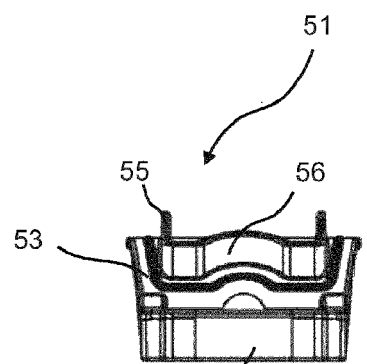
FIG. 6D is a side elevational view of the clamping part of FIG. 6A.
Figure 6C:
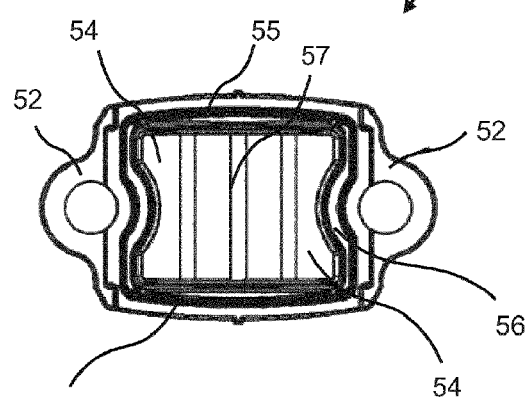
FIG. 6C is a top plan view of the clamping part of FIG. 6A.
Figure 7A:
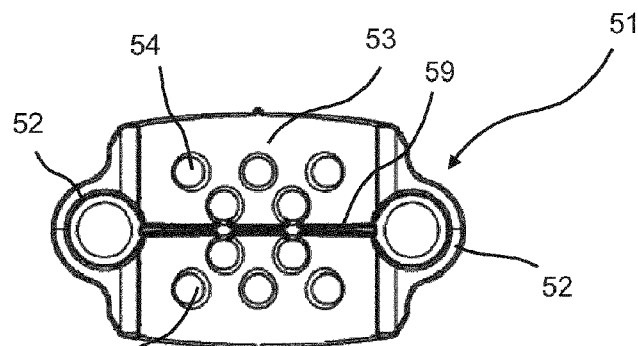
FIG. 7A is a bottom plan view of a clamping part of a master cylinder according to an embodiment of the invention (i.e., from the direction of the handlebar tube to which the master cylinder has to be attached)
Figure 7B:
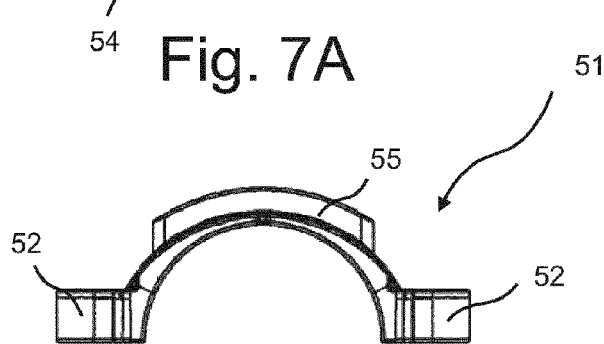
FIG. 7B is a side elevational view of the clamping part of FIG. 7A.
Figure 7D:
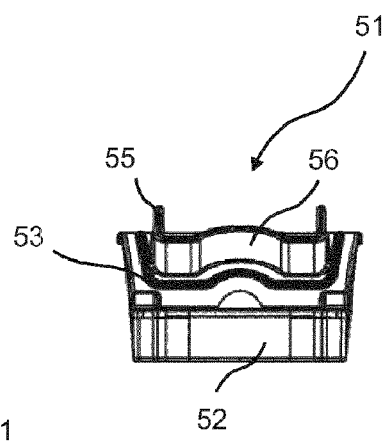
FIG. 7D is a side elevational view of the clamping part of FIG. 7A.
Figure 7C:
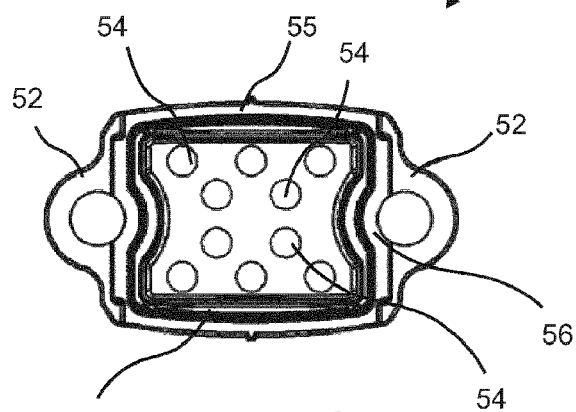
FIG. 7C is a top plan view of the clamping part of FIG. 7A.
Figure 8A:
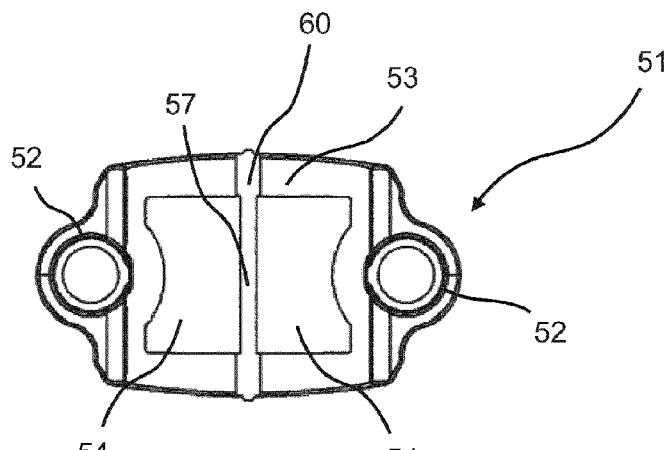
FIG. 8A is a bottom plan view of a clamping part of a master cylinder according to an embodiment of the invention (i.e., from the direction of the handlebar tube to which the master cylinder has to be attached)
Figure 8B:
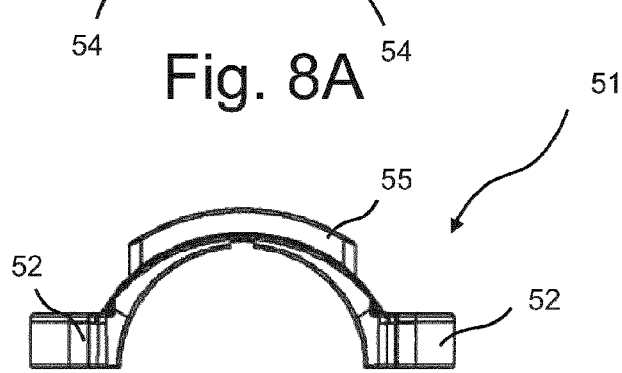
FIG. 8B is a side elevational view of the clamping part of FIG. 8A.
Figure 8D:
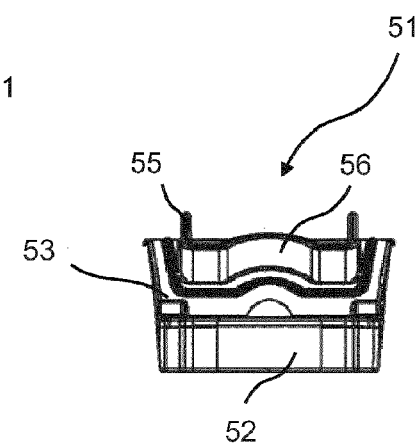
FIG. 8D is a side elevational view of the clamping part of FIG. 8A.
Figure 8C:
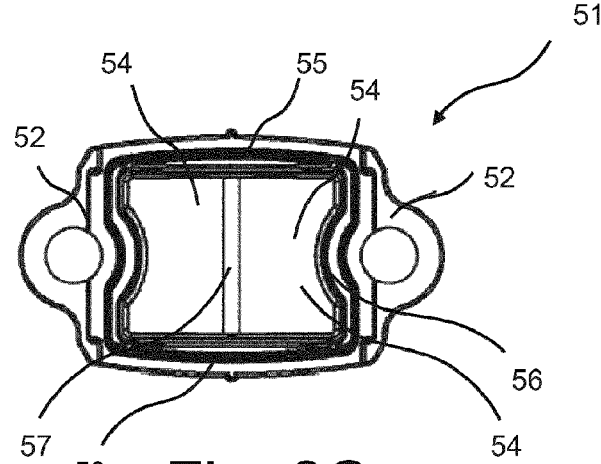
FIG. 8C is a top plan view of the clamping part of FIG. 8A.
Figure 11:
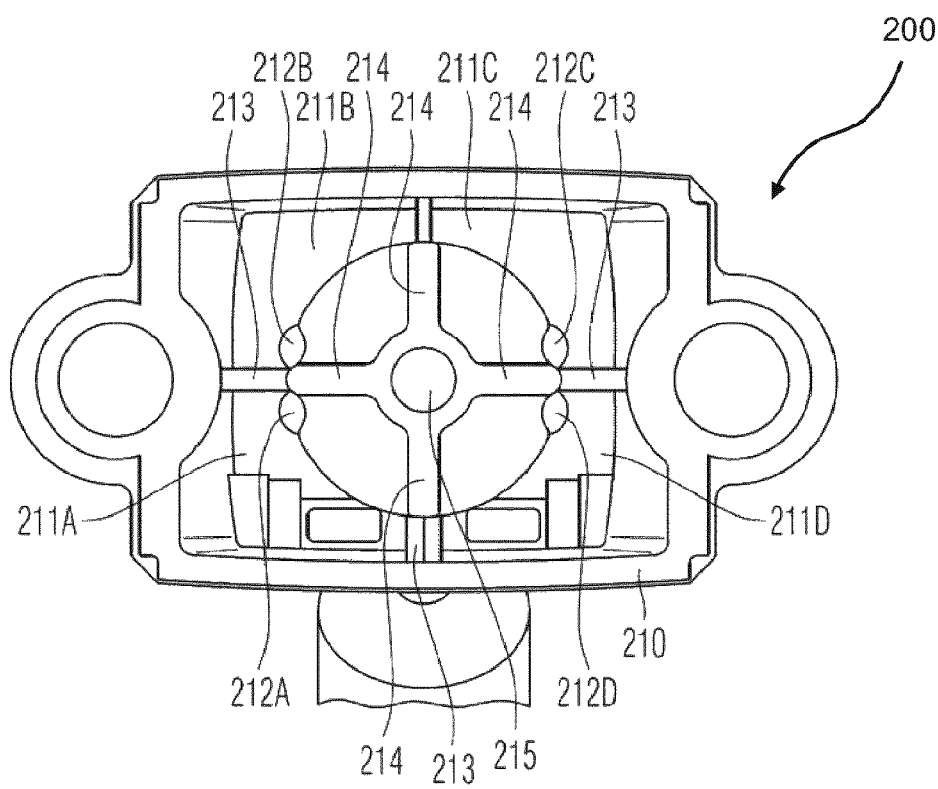
FIG. 11 is a top plan view of internal portion of a housing of a master cylinder according to an exemplary embodiment of the invention without a clamping part and without a separating member.
Figure 12:
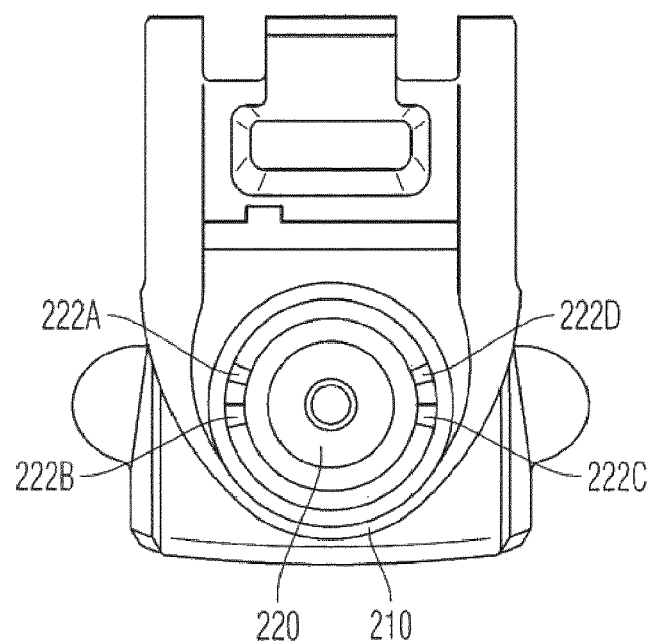
FIG. 12 is a side elevational view of the housing of the master cylinder of FIG. 11 in the direction of the cylinder without the piston and without the parts closing the piston chamber.
Figure 13:
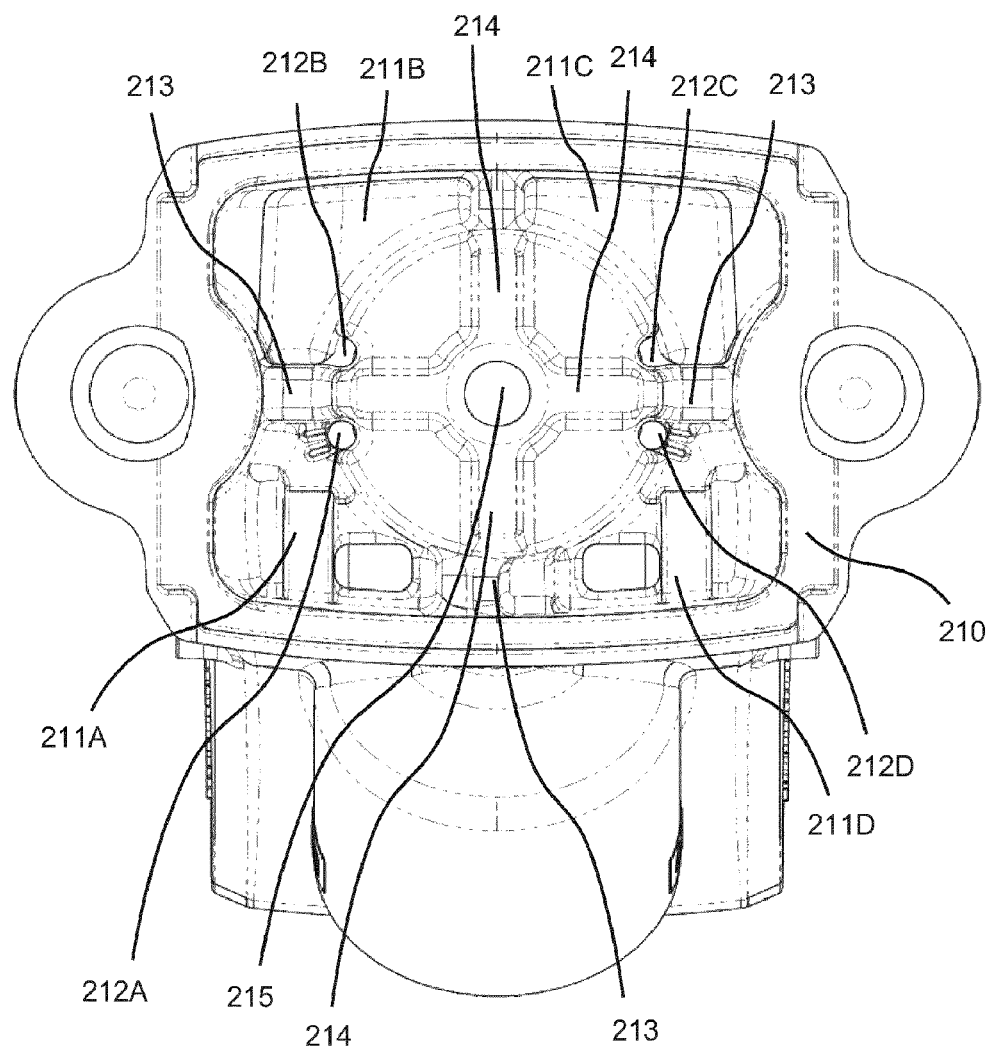
FIG. 13 is a partially hidden top plan view of the master cylinder of FIG. 11 with a part of the housing shown in the direction of the balancing container without the clamping part and the separating member.
Figure 14:
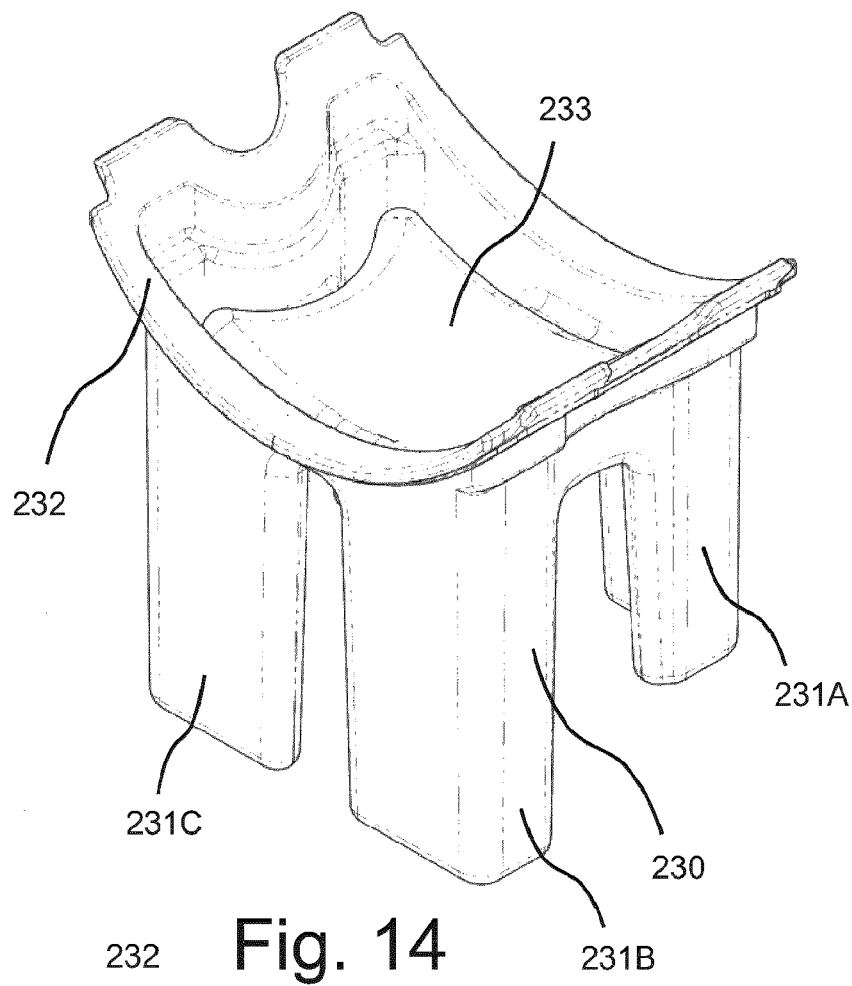
FIG. 14 is a perspective view of the separating member of the master cylinder of FIG. 11.
Figure 15:
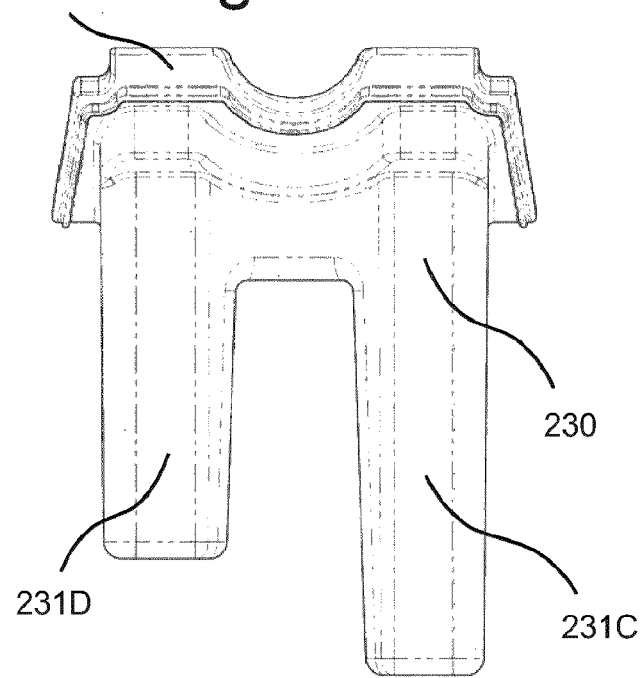
FIG. 15 is a side elevational view of the separating member of FIG. 14.
Figure 16:
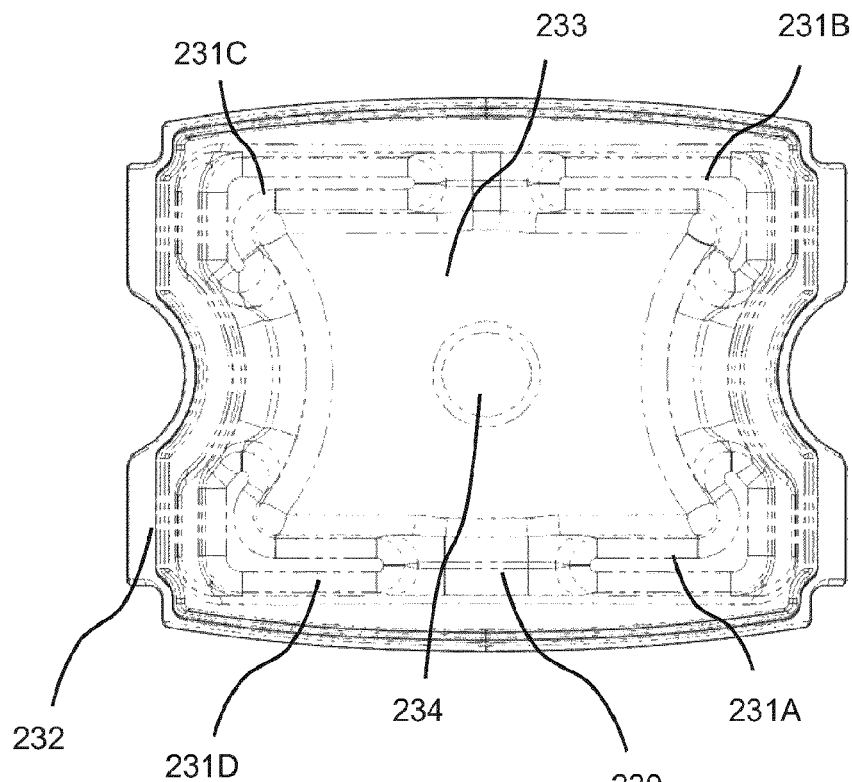
FIG. 16 is a partially hidden and bottom plan view of the separating member of FIG. 14, i.e., from the direction of the housing.
Figure 17:
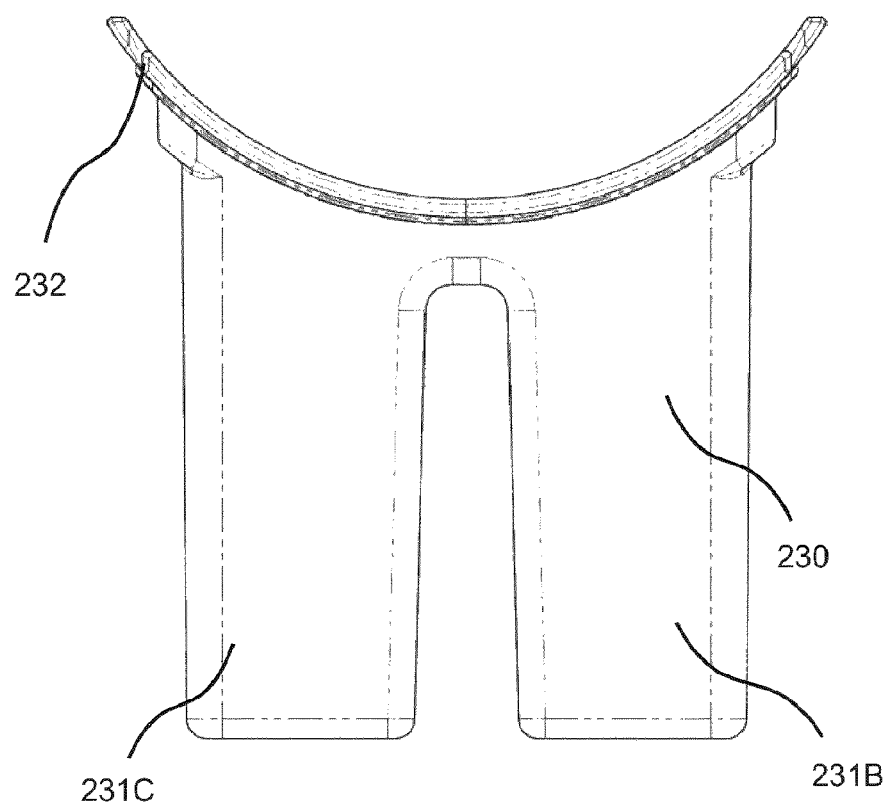
FIG. 17 is a side elevational view of the separating member of FIG. 14.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIGS. 1A to 1D, there is shown a first exemplary embodiment of a clamping part of a master cylinder. On its two sides, the clamping part 51 has two attachment portions 52 by which the clamping part 51 can be attached to a housing of the master cylinder. Thereby (when the clamping part 51 is attached (or fastened) to the housing), the clamping part 51 clamps with its frame 53 a separating member against the housing of the master cylinder, which separating member separates the hydraulic fluid in the compensating chamber from a gas volume or compensating volume. The clamping part 51 has a breakthrough or an opening 54 within the frame 53. A ridge 55 is provided at the frame 53 to guide the separating member. In the region of the attachment portions 52, curvatures 56 are provided. In an exemplary embodiment, the clamping part 51 can be screwed to the housing of the master cylinder by screws.

FIGS. 2A to 2D show an alternative to the exemplary embodiment of the clamping part illustrated in FIGS. 1A to 1D, which differs from the latter in that the clamping part has a ridge 57 that forms two openings 54 within the frame 53.

FIGS. 3A to 3D show another alternative exemplary embodiment of the clamping parts illustrated in FIGS. 1A to 2D, which differs from those to the effect that the clamping part 51 has several ridges 57, 58 substantially perpendicular to one another and, therefore, forming four openings 54 within the frame 53.

FIGS. 4A to 4D show a further alternative exemplary embodiment of the clamping parts illustrated in FIGS. 1A to 3D, which differs from those to the effect that the clamping part 51 has several ridges 57, 58 disposed in substantially a grid-like fashion and, therefore, several openings 54 are formed within the frame 53.

FIGS. 5A to 5D show another alternative exemplary embodiment of the clamping parts illustrated in FIGS. 1A to 4D, which differs from those to the effect that the clamping part 51 has several ridges 58 substantially parallel to one another and, therefore, forming four openings 54 within the frame 53.

FIGS. 6A to 6D show another alternative exemplary embodiment of the clamping parts illustrated in FIGS. 1A to 5D, which differs from those to the effect that the clamping part 51 has several ridges 57 substantially parallel to one another and, therefore, forming four openings 54 within the frame 53.

FIGS. 7A to 7D show another alternative exemplary embodiment of the clamping parts illustrated in FIGS. 1A to 6D, which differs from those to the effect that several openings 54 are formed in the clamping part 51. Furthermore, two ventilation channels 59 are provided in the clamping part 51 to guarantee a good connection between the compensating chamber and the environment.

FIGS. 8A to 8D show another alternative exemplary embodiment of the clamping parts illustrated in FIGS. 1A to 7D, which differs from those to the effect that the clamping part 51 has a ridge 57 forming two openings 54 within the frame 53 and two ventilation channels 60 in the frame 53 so as to ensure a good connection between the compensating chamber and the environment.

FIGS. 9A to 9D show another alternative exemplary embodiment of the clamping parts illustrated in FIGS. 1A to 8D, which differs from those to the effect that the clamping part 51 has two ventilation channels 60 within the frame 53 to ensure a good connection between the compensating chamber and the environment.

FIGS. 10A to 10D show another alternative exemplary embodiment of the clamping parts illustrated in FIGS. 1A to 9D, which differs from those to the effect that the clamping part 51 has a ridge 57 forming two openings 54 within the frame 53 and ventilation channels 60 in the frame 53 to ensure a good connection between the compensating chamber and the environment. In this embodiment, the frame 53 can be fully discontinued at the ventilation channels because the frame is still connected through the ridge 57. Furthermore, a sufficient clamping effect can be achieved by screws provided in the attachment portions 52, for example. Here, the separating member to be clamped between the housing of the master cylinder and the clamping part can have correspondingly formed thickenings or reinforcements.

The following figures show various embodiments of master cylinders according to the invention, which can be made with a clamping part according to one of the clamping parts shown in FIGS. 1A to 10D, for example. In the following figures, the clamping part is shown only by way of diagram and, due to the details, reference is made to the illustrations of the exemplary concrete embodiments shown in FIGS. 1A to 10D.

Alternatively, the separating member can also be clamped directly between the handlebar tube and the housing, as described above and claimed in the claims, when the housing is attached to the handlebar tube. In doing so, the separating member can be adhered to the housing beforehand. Alternatively or additionally, the separating member can be clamped into the housing by a tongue-and-groove connection, for example. Likewise, a clamping part can be connected to the housing of the master cylinder by an adhesive and/or a clamping connection to connect the separating member to the housing to make a separation between the hydraulic fluid and the environment in the compensating member.

FIGS. 11 to 17 show details of a master cylinder according to the invention, wherein the focus is on the development of the compensating chamber 211A, 211B, 211C, 211D and the separating member 230 formed as a bellows.

The compensating chamber is divided into four sections 211A, 211B, 211C, and 211D, which sections are disposed in the housing 210 of the master cylinder around the piston chamber 220. The piston chamber 220 is centrally disposed in the housing of the master cylinder and has a piston (not shown) slidably disposed therein. At the cylinder wall, the piston chamber 220 has four openings 222A, 222B, 222C, 222D, which are connected to a respective compensating chamber portion 211A, 211B, 211C, 211D through compensating bores 212A, 212B, 212C, 212D to create a connection between the pressure chamber and the compensating chamber as long as the piston has not traveled over the openings 222A to 222D by its gasket (both not shown). The cylindrical wall confining the piston chamber 220 is connected to the wall of the housing of the master cylinder by ridges 213. This leads to higher rigidity. Instead of the ridges 213, it is also possible to provide ribs or bridges, or other reinforcing elements. When these elements do not reach to the bottom of the compensating chamber (the lower plane shown in FIG. 11 and/or FIG. 13), it is also possible to provide only one compensating bore because a connection is created at the bottom of the compensating chamber to exchange the hydraulic fluid.

Ribs 214 are formed on the front face concluding the piston chamber 220 and are substantially cross-shaped. These ribs 214 serve for reinforcement and can be omitted, as desired.

In the middle of the cross formed by the ribs 214, a recess 215 is provided, with which a bulge 234 of the bellows 230 can mesh. See FIG. 16. The bellows (or the separating member) 230 is shown in FIGS. 14 to 17. The bellows 230 has four projections 231A, 231B, 231C, 231D, which extend from a surface 233 downwards. The projections 231A, 231B, 231C, 231D comprise substantially L-shaped columns made to use the volume available around the piston chamber as optimally as possible. The bellows 230 has a circumferential edge 232 that is formed in accordance with the edge of the housing of the master cylinder so that it can be sealed with respect to the housing by a clamping member, as shown in FIGS. 1A to 10D, for example, to create a compensating chamber that is sealed outwards and the volume of which can be adapted to the hydraulic fluid amount available in the compensating chamber by deforming the bellows.

Figure 18:
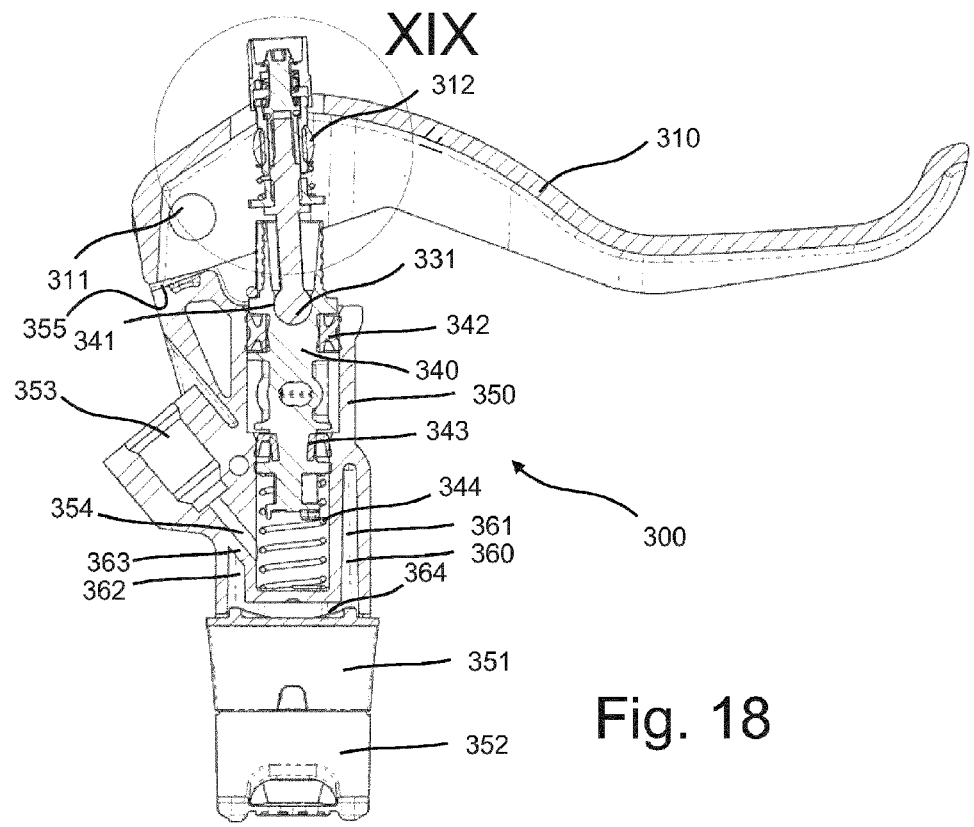
FIG. 18 is a cross-sectional view of a master cylinder of a hydraulic disk brake according to an exemplary embodiment of the invention.
Figure 19:
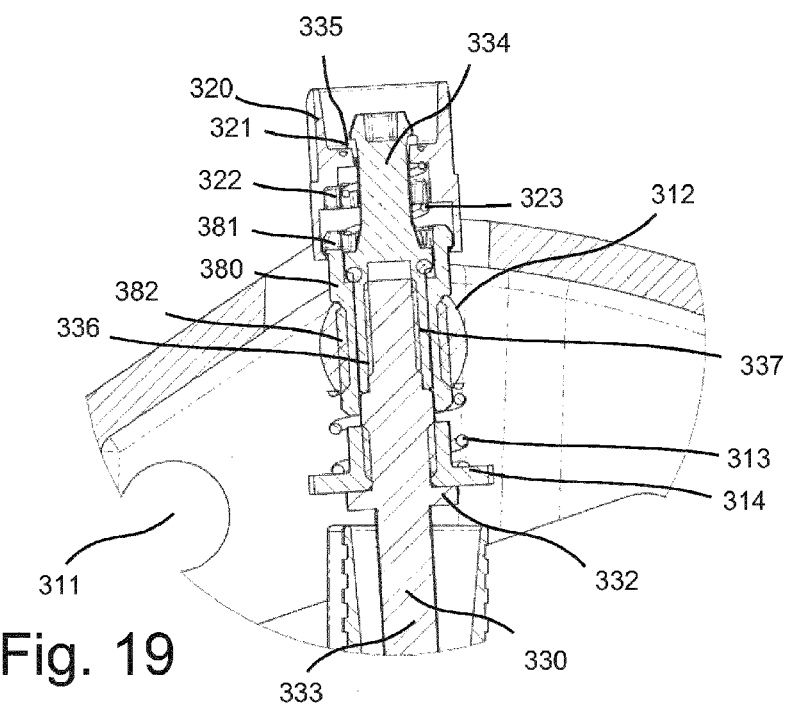
FIG. 19 is a fragmentary cross-sectional view of a portion of the master cylinder of FIG. 18 in the area of circle XIX.
Figure 22:
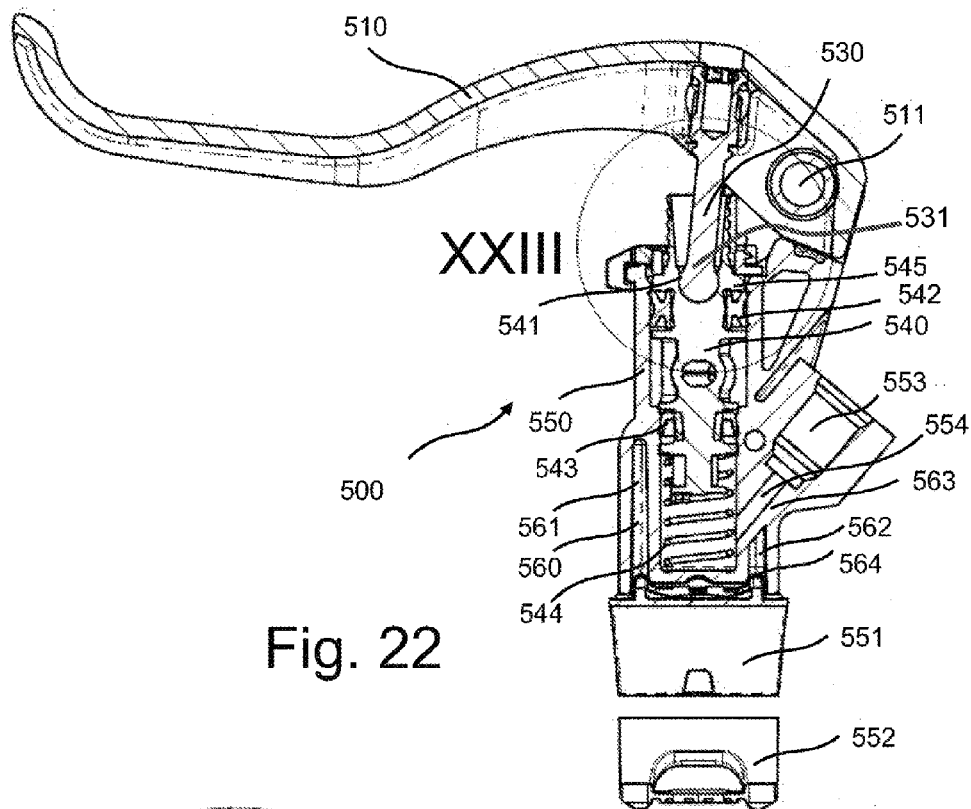
FIG. 22 is a cross-sectional view of a master cylinder according to a further embodiment of the invention of a hydraulic disk brake.
Figure 23:
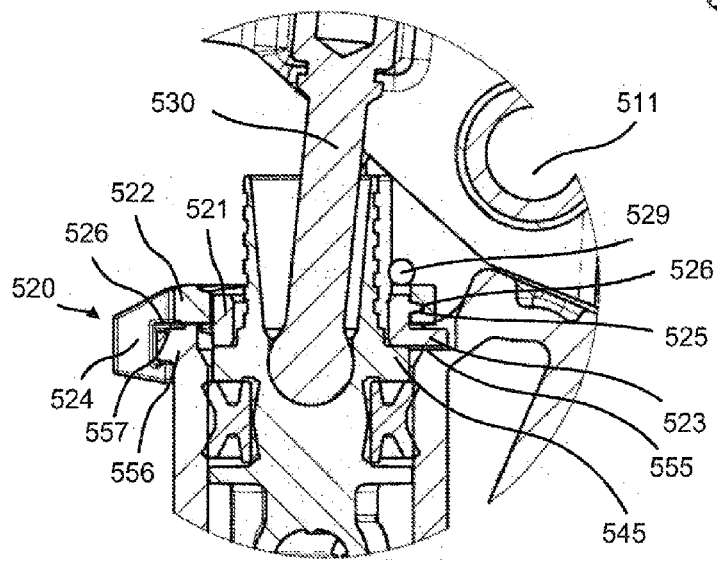
FIG. 23 is a cross-sectional view of the master cylinder of FIG. 22 within the range of the circle XXIII.
Figure 24:
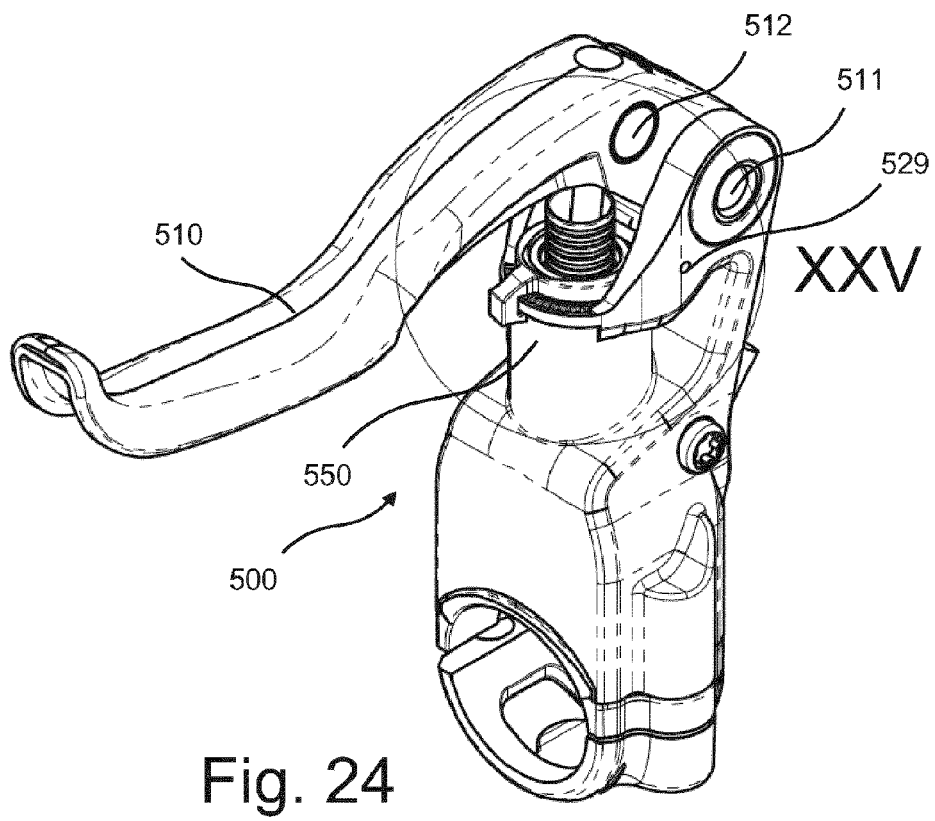
FIG. 24 is a perspective view of the master cylinder of FIG. 22.
Figure 25:
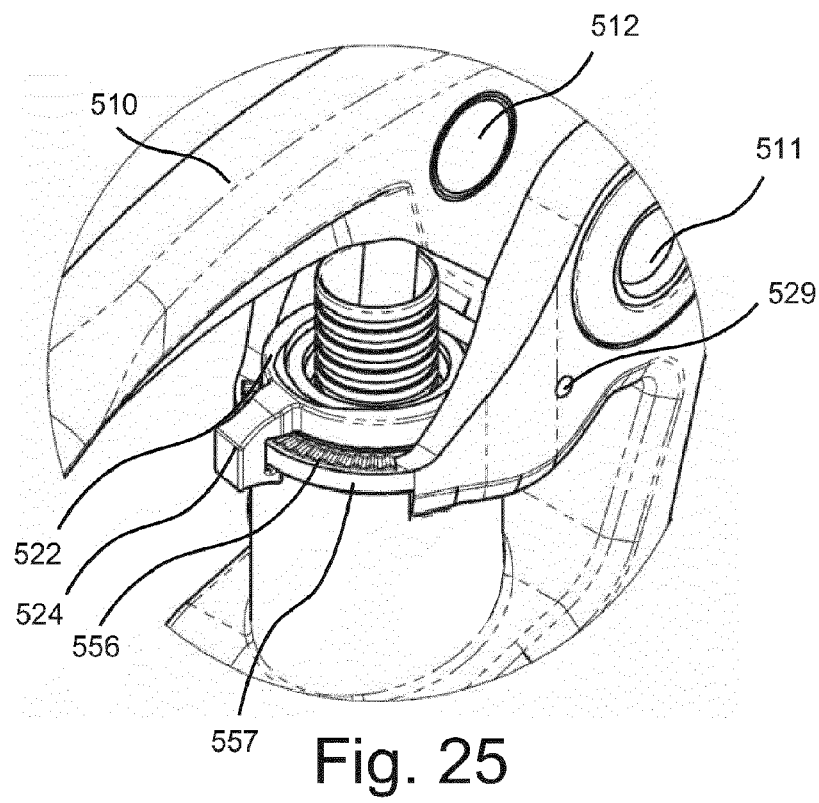
FIG. 25 is a fragmentary, enlarged perspective view of the master cylinder of FIG. 24 within the range of the circle XXV.
Figure 26:
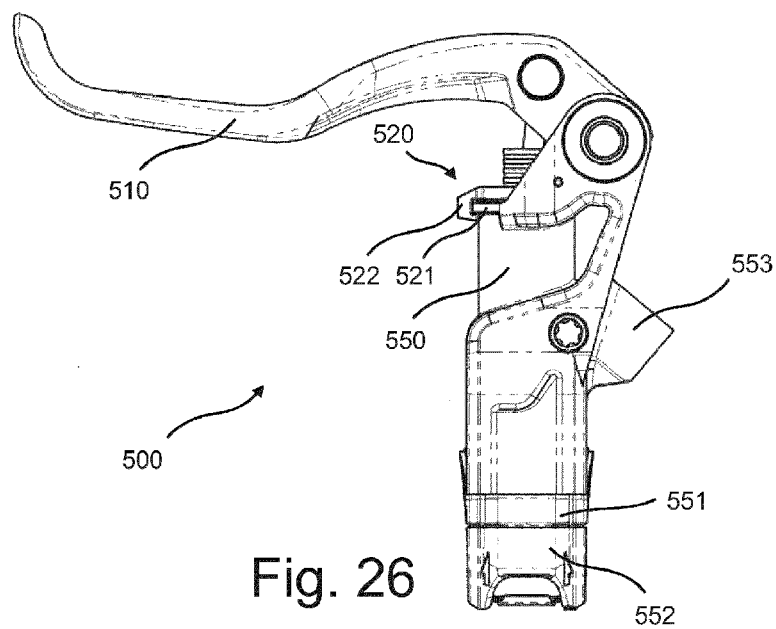
FIG. 26 is a side elevational view of the master cylinder of FIG. 22.
Figure 27:
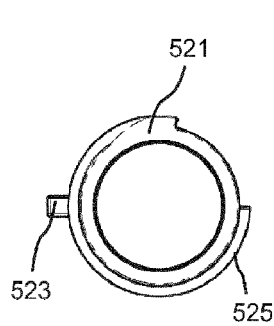
FIG. 27 is a bottom plan view of the space member of the master cylinder of FIG. 22.
Figure 28:
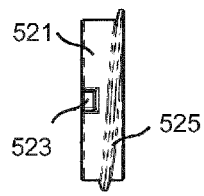
FIG. 28 is a side elevational view of the space member of FIG. 27.
Figure 30:
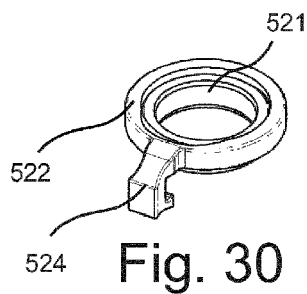
FIG. 30 is a perspective view of the operating device of the pressure point adjusting apparatus of the master cylinder of FIG. 22.
Figure 29:
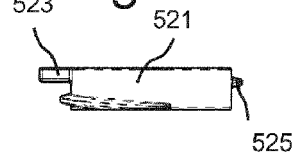
FIG. 29 is a side elevational view of the space member of FIG. 27.
Figure 31:
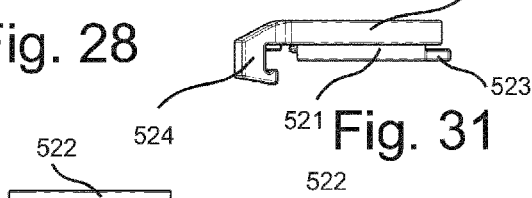
FIG. 31 is a side elevational view of the actuation device of FIG. 30.
Figure 33:
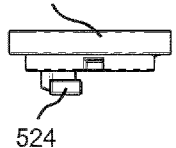
FIG. 33 is a side elevational view of the actuation device of FIG. 30.
Figure 32:
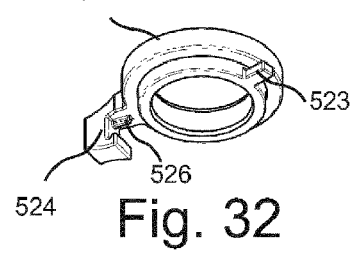
FIG. 32 is a perspective view of the operating device of FIG. 30 from below.

FIGS. 18 and 19 show an exemplary embodiment of a master cylinder 300 of a hydraulic disk brake. The master cylinder 300 has a brake lever 310 rotatably supported to the housing of the master cylinder via a bolt 311. The master cylinder 300 has a housing 350 that can be attached to the handlebar tube via the clamping part 351 and a clamp 352 that receive and surround the handlebar tube, respectively. The handlebar tube as such is not shown in this exemplary embodiment. A piston 340 is slidably disposed in known manner in the piston chamber of the master cylinder 300. The piston 340 is sealed with respect to the cylinder wall via gaskets 342 and 343.

An adjusting apparatus has a button 320, disposed on a spindle 330. The spindle 330 is connected to the piston 340. The spindle 330 has a head 331 that is firmly locked in a support 341 of the piston 340 such that an axial movement of the spindle 331 is not possible while the spindle 330 can be tilted against the piston 340, which is necessary when the master cylinder 300 is actuated. The spindle 330 has a collar 332. The spindle 330 is made of two parts and has a part 333 (lower part) that is closer to the piston 340 and an outer part (upper part) 334 connected to the actuation button 320 of the adjusting apparatus. The upper spindle part 334 is connected to the lower spindle part 333 via a threaded connection, i.e., that the length of the spindle 330 becomes larger or smaller when the upper part 334 is turned against the lower part 333. The upper part 334 of the spindle has an external toothing 335 that meshes with an internal toothing 321 when the button 320 has a position shown in FIG. 19. When the button 320 is turned, the outer part 334 of the spindle 330 thus turns due to the engagement of the toothing 321 with the toothing 335. Thus, the outer part 334 is turned via its internal thread 336 on the external thread 337 of the inner part 333 of the spindle 330. The length of the spindle thus changes, as does the position of the piston 340 in the piston chamber. As a result, it is possible to change the pressure point or the free travel, i.e., the distance of the piston 340 that the piston 340 has to cover in the cylinder so that the gasket 343 travels over the compensation bore.

The master cylinder 300 also has a locking sleeve 380 that is screwed via an external thread 382 into a bolt 312 received in a support. The locking sleeve 380 has a front-end toothing 381. The button 320 of the adjusting apparatus has a toothing 322 that can be engaged with the front-end toothing 381 of the locking sleeve 380 by pushing the button 320 in the direction of the piston 340. By pushing the button 320 it is thus possible to turn the locking sleeve 380 in the bolt 312 by turning the button 320 as a result of the engagement of the toothing 322 with the toothing 362 so as to adjust the handle width. A spring 323 is provided in the button 320 and biases the button 320 outwards. This bias ensures that the adjusting device is always in the position for adjusting the free travel or the pressure point when the button 320 is not actively pushed.

To adjust the handle width, the button 320 must be actively pushed in the direction of the piston 340 and the spring 322 ensures that, after the accomplished handle width adjustment, the button 320 returns into its original position in which the free travel or the pressure point can be adjusted.

The master cylinder 300 has a spring 313 that biases the lever 310 in its rest position, i.e., about the fulcrum 311 against the stop 355 of the housing. As a result, the support for the bolt 312 is biased outwards. The spring 313 supports itself on the outer part 334 of the spindle 330 and on the opposite side on a nut 314 that is secured against turning. In the housing 350 of the master cylinder 300, a compensating chamber 360 is provided that has several sectors. The portion 361 arranged on the side opposite to the filling opening 353 is shown. On the side opposite to this portion, the transitional region 362 between two portions (not shown) of the compensating chamber 360 is shown, which are separated by a ridge 363 through which the channel 354 runs. A separating member or a bellows 364 limiting the compensating chamber 360 is between the clamping part 351 and the housing 350. According to an exemplary embodiment of the invention, the bellows 364 can be made as shown in FIGS. 13 to 17, for example. In the present embodiment of FIGS. 18 and 19, the compensating chamber 360 has three compensating chamber portions, i.e., the compensating chamber portion 361, which is opposite to the filling opening 353 and is separated via two ridges from two further portions that are disposed substantially symmetrically to the filling opening 353. The compensating chambers extend over approximately 120° each. Alternatively, the compensating chambers can also extend around the piston chamber over different angular ranges. For example, the compensating chamber opposite to the filling opening 353 might extend over 180° and the compensating chambers on the sides of the filling opening or the channel 354 might extend over approximately 90°, wherein the angle range would have to be reduced by the measure of the ridges separating the compensating chamber portions.

The master cylinder 300 is attached with the clamping part 351 and the counterpiece 352 to the handlebar (not shown). In order to facilitate the assembly, the counterpiece 352 can have an angle range of less than 180°, which encloses the handlebar tube, and the clamping part 351 can enclose an angle range that comprises more than 180°. The advantage is that the master cylinder 300 can be forced onto the handlebar tube and, therefore, the assembly can be simple and easy.

FIGS. 20 to 21A show a further exemplary embodiment of a master cylinder of a hydraulic brake or clutch according to the invention. The same components are designated by corresponding reference signs that are increased by 100 with respect to the embodiment of FIGS. 18 to 19. Only the differences are described below and, as for the rest, reference is made to the description of the other exemplary embodiments and, in particular, the description of the exemplary embodiment of FIGS. 18 and 19. The exemplary embodiment of FIGS. 20 to 21A differs from the exemplary embodiment in FIGS. 18 and 19 by a different adjusting apparatus that has a separate actuation element for the adjustment of the handle width and the adjustment of the pressure point. The lever 410 is rotatably supported about a bolt 411. For this purpose, a pressure piece 470 is provided, which is rotatably supported about the bolt 411. The lever 410 supports itself on the pressure piece 470 via an adjusting apparatus for the handle width. A spring 413 is provided between the pressure piece 470 and the lever 410 and biases the lever 410 in the adjusting apparatus against the pressure piece 470. The adjusting apparatus for the handle width 420 has a turning knob 421 that is rotatably supported in the lever 410 about its axis. It is held in position by a collar 423. A spacer 422 is disposed in the turning knob 421. In the region of the turning knob 421, it has an external thread that is connected to an internal thread of the turning knob 421. The pressure piece 470 has in the region of the adjusting knob or the spacer 422 two spaced-apart projections 471, 472, between which a projection 424 of the spacer 423 extends. A flange 425 is provided between the threaded portion and the projection 424, said flange 425 having a substantially circular shape in the embodiment as shown. The adjusting apparatus supports itself on the pressure piece 470 by the flange 425. Since the turning knob 421 is firmly connected to the lever 410 in an axial direction, the lever 410 thus supports itself via the button 421 and the spacer 422 and the flange 425 on the pressure piece 470.

FIG. 21A shows a view of the spacer 422 and a part of the pressure piece of the master cylinder 400 of FIG. 20 from the direction of the piston 340, wherein the other parts are omitted for the purpose of overview.

In order to adjust the handle width, the turning knob 421 is turned with respect to the spacer 422 held between the two projections 471, 472 of the turning piece 470 in rotationally fixed fashion and, therefore, the relative position between the turning knob 421 and the spacer 423 is displaced. As a result, the handle width is adjusted.

The embodiment according to FIGS. 20 to 21A also has an adjusting apparatus for the free travel or pressure point. Here, the spindle 430 is turned in a sleeve 433, which is connected to a bolt 412 for conjoint rotation via pins 434, said bolt 412 being disposed in the support of the pressure piece 470. For the purpose of rotation, the spindle 430 has a tool engaging portion 435. Therefore, the distance between the sleeve 433 and the collar 432, which defines the free travel 436, is adjusted by turning the spindle 430.

FIGS. 22 to 32 show a further exemplary embodiment of a master cylinder of a hydraulic brake or clutch according to the present invention. The embodiment of FIGS. 22 to 33 corresponds substantially to the embodiments shown and described in FIGS. 18 to 19 or 20 to 21A. Equal components are designated by equal reference signs, which are increased with respect to the embodiment of FIGS. 18 to 19 by 200 and with respect to the embodiment of FIGS. 20 to 21A by 100. Hereinafter, only the difference with respect to the embodiments shown in FIGS. 18 to 19 or 20 to 21A is described. Furthermore, reference is made to the rest of the description and in particular to the description of the exemplary embodiments of FIGS. 18 to 19 and 20 to 21A.

The master cylinder according to an exemplary embodiment of the invention, which is described in FIGS. 22 to 33, can be used in connection with a hydraulic brake or hydraulic clutch, preferably, in a vehicle steered by handlebars, e.g. a bicycle or a motorbike.

The master cylinder shown in FIGS. 22 to 33 has an adjusting apparatus 520 for adjusting the limit stop of the piston 540. The piston 540 is received in slidable fashion in a cylinder bore in the housing 550. A head 531 of a spindle 530 is locked in a support 541. The spindle is connected to a lever 510, which is rotatably supported about a bolt 511. The piston 540 has a collar 545 that defines the end position of the piston 540 in the master cylinder by a stop against the adjusting apparatus 520.

The adjusting apparatus 520 has a stop part 521 that comprises a projection 523 that meshes with a support 555 of the housing 550. The stop part 521 is disposed in rotationally fixed fashion in the housing. For this purpose, the projection 523 is accommodated in the support 555 of the housing 550. The side of the stop part 521, which is opposed to the collar 545 of the piston 540, here serves as a stop surface that defines the rotational position and/or the orientation of the piston 540 in the housing 550 of the master cylinder 500. In the figures, the piston 540 is shown in its end position, i.e., the piston 540 abuts against the stop part 521 via the collar 545. The projection 523 is disposed in the support 555 so that it can move in an axial direction of the piston 540 but not in the circumferential direction of the piston 540. The stop member 521 has a flange having an external thread 525. The external thread 525 comprises a coil of about three-quarter of a rotation, i.e., less than one turn. The adjusting apparatus 520 also comprises an actuation member 522 that has an internal thread 526 corresponding to the external thread 525, the internal thread 526 accommodating the external thread 525 of the stop member 521. The adjusting member 522 comprises an actuation element 524 where the user can engage to turn the adjusting member 522 relative to the stop element 521 about the axis of the piston 540. This changes the relative position of the stop member 521 in the adjusting member 522, which defines the end position of the piston 540.

The adjusting member 522 engages with the actuation member 524 behind a collar 557 of the housing. On the opposite side, the adjusting member 522 is secured by a pin 529 counter to the actuation direction upon actuation of the master cylinder 500. The pin 529 is supported in the housing. In the region of the pin 529, the piston 540 can also have a flattening 649 (as shown in the embodiment according to FIG. 34) and, therefore, the piston 540 is disposed in a clear rotational position in the housing 550, facilitating detection of a position of the piston 540.

The adjusting member 522 has a protrusion 526 that engages a locking 556 provided on the collar 557 to prevent an unintended adjustment of the adjusting apparatus 520. Actuation of the adjusting apparatus 520 requires a force that suffices to move the projection 526 beyond the locking 556. By turning the adjusting member 521 about the axis of the piston 540, the thread is turned between the plug-in member 552 and the spacing member 521 such that the spacing member 521 moves relative to the plug-in member 522 and, thus, relative to the pin 529 and the collar 557, i.e., relative to the housing 550 in an axial direction of the piston 540, and, therefore, the end position of the piston 540 is changed.

Figure 34:
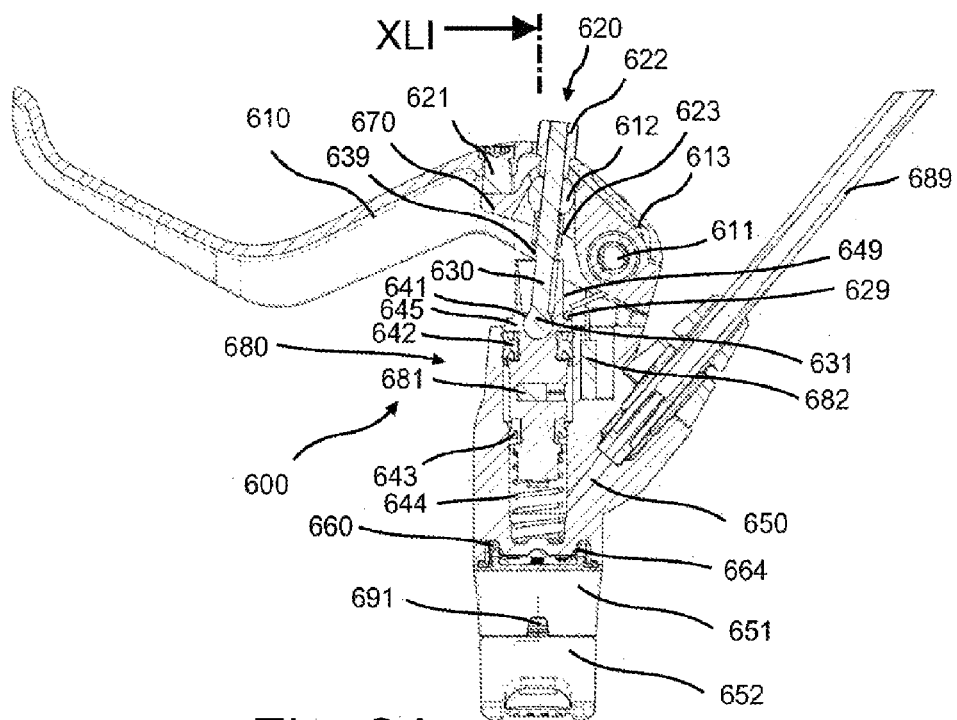
FIG. 34 is a cross-sectional view of a master cylinder of a further exemplary embodiment of the invention with a sensor device for detecting the position of the piston along the line XXXIV-XXXIV of FIG. 36.
Figure 35:
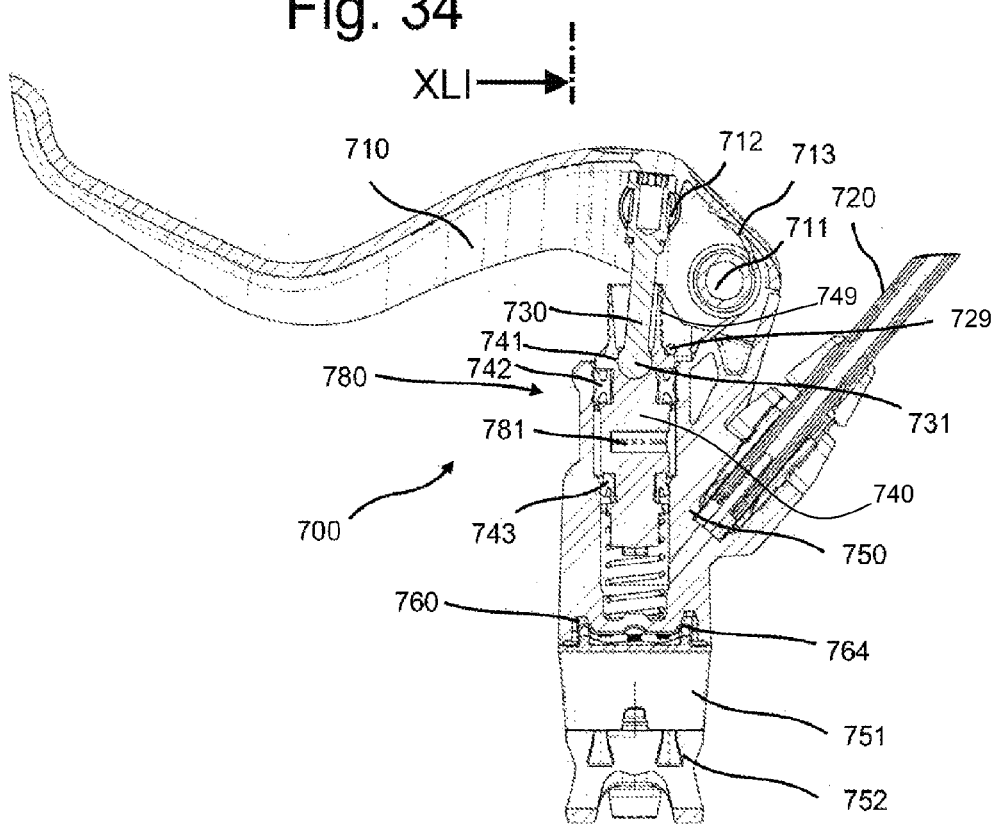
FIG. 35 is a cross-sectional view of a master cylinder according to a further exemplary embodiment of the invention.

FIGS. 34 and 35 show further embodiments of a master cylinder of a hydraulic brake or clutch according to the present invention.

The embodiment of FIG. 34 corresponds, in particular, substantially to the embodiment that is shown and described in FIGS. 20 to 21A. Equal components are designated by equal reference signs that are increased by 200 with respect to the embodiment of FIGS. 20 to 21A. Only the difference to the embodiment according to FIGS. 20 to 21A is described below. Furthermore, reference is made to the rest of the description and, in particular, to the description of FIGS. 20 to 21A.

The master cylinder 600 according to FIGS. 34 has an adjusting apparatus 620 for the handle width. A spacing member 621 is screwed into the lever 610 and supports itself on the pressure piece 670. As a result, the relative position, i.e., the angle between the pressure piece 670 and the lever 610, is adjusted based upon the bolt 611. Irrespective of the adjustment of the handle width, the pressure point or the free travel can be determined or adjusted by the actuation member 622, which turns the spindle 630 in the bolt 612 that is accommodated in the pressure piece 670. Here, free travel is adjusted between a sleeve 623 disposed in rotationally fixed fashion with respect to the spindle 630 and the bolt 612. The sleeve 623 here has an internal thread that cooperates with an external thread provided on the spindle 630. The maximum adjustability is limited by a stop 639, which is made as a collar on the spindle 630.

Pin 629 is disposed in the housing and defines a fixed rotational position of the piston 640, in which the pin 629 glides along a surface or flattening 649, which is formed on the piston 640, upon the actuation of the master cylinder 600.

Pin 629 defines the end position of the piston 640 in the housing 650. In the embodiment as shown, the pin 629 is made of steel and has a thickness of about 1.5 mm. So that the pin does not bend in spite of its small dimension (diameter 1.5 mm), the connection between the head 631 of the spindle 630 and the support 641 is provided in the piston 640 as a predetermined breaking point. Strong forces can occur in the case of a fall, for example, where the lever 610 is turned outwardly counter to the actuation direction.

Since the surface or flattening 649 is or has a flattened area in the outer region of the piston 640, the pin 629 abutting against this flattening or surface 649 defines the rotational position of the piston 640. The advantage is that the relative position of the piston 640 in an axial direction, i.e., that the measure of the actuation, can be detected more easily. In particular, it is not absolutely necessary to provide for a piston position detection device 680 that can detect the position of the piston 640 irrespective of the rotational position of the piston 640 in the cylinder bore, i.e., the position of the piston 640 in an axial direction, i.e., a measure for the actuation of the master cylinder 600. For example, the piston position detection device 680 can comprise a magnet 681 that cooperates with a sensor 682 to detect the axial position of the piston 640 in the cylinder bore of the housing 650. When the piston 640 is kept by the pin 629 in a certain rotational position, the magnet 681 can be a bar magnet. The magnet 681 is here preferably pressed transversely in the piston 640 and is flush or molded with the circumferential surface of the piston 640. Preferably, the magnet 681 is disposed as closely as possible to the circumferential surface of the piston 640 to enable as good a signal generation as possible. The sensor 682 can have a reed contact or comprise a Hall sensor, for example. Other devices are conceivable, which are known to a person skilled in the art and which are configured to detect an axial position of a component slidably disposed in a bore.

According to an embodiment (not shown), a clip can also be provided that secures the head 631 of the spindle 630 in the support 641 of the piston. The advantage provided by this is that the spring 644 optionally can be omitted or can have a smaller spring constant because the lever retracts the piston 640 in its rest position when, e.g., the spring 613 is made in correspondingly strong fashion. It might be a drawback that the predetermined break point is omitted which is formed by the head 631 of the spindle 630, which is arranged in the support 641.

Figures 36, 37:
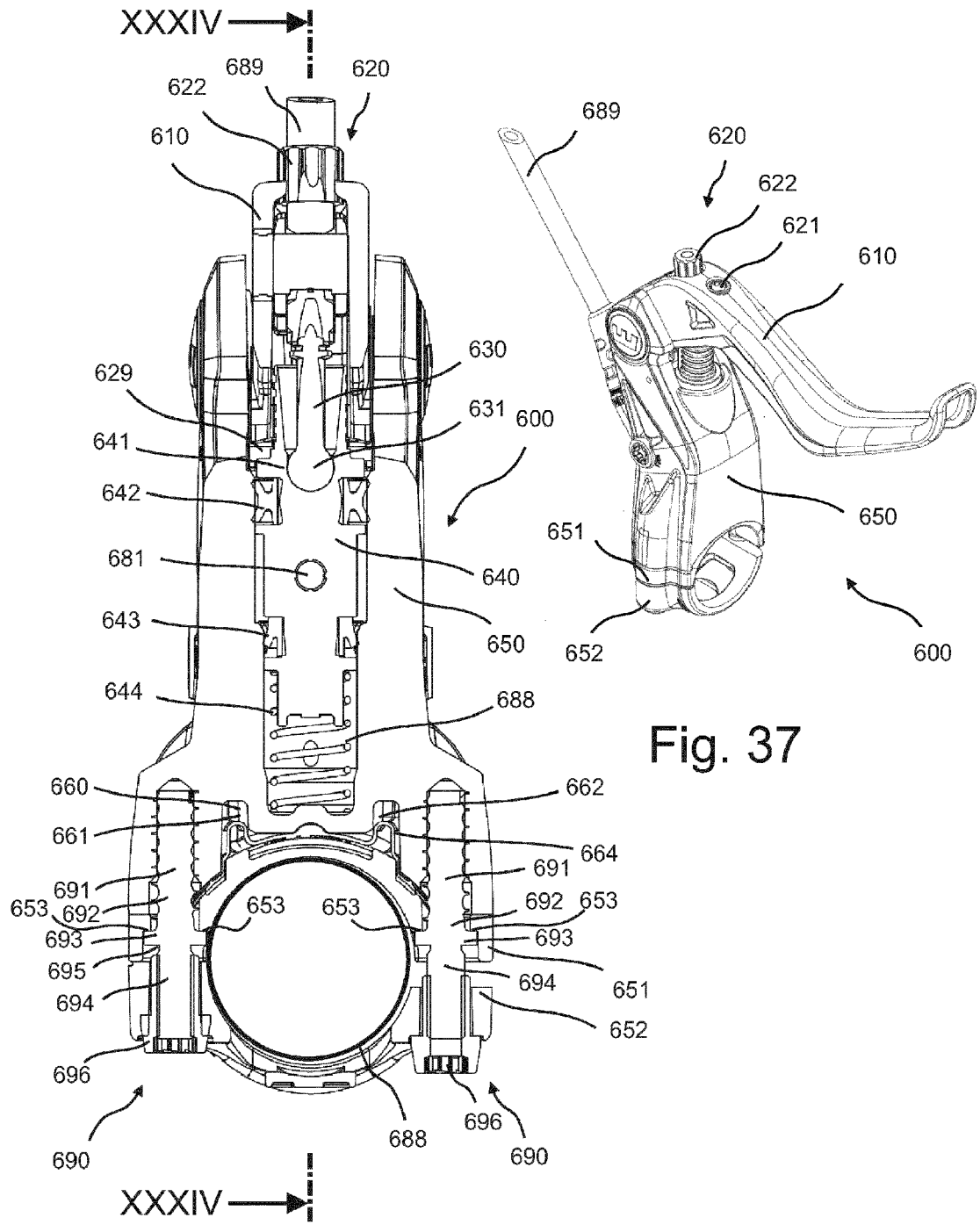
FIG. 36 is a cross-sectional view of the master cylinder of FIG. 34 along line XLI-XLI of FIG. 34.
FIG. 37 is a perspective view of the master cylinder of FIG. 34.

FIG. 36 shows a sectional view of the master cylinder of FIG. 34 along line XLI-XLI of FIG. 34.

In particular, FIG. 36 shows an attachment of the master cylinder to a handlebar tube 688. The master cylinder has two connecting devices 690 that comprise studs. The connecting devices 690 have a first connecting portion 691 that is screwed into a respective corresponding bore in the housing 650. In place of a screw connection, it is also possible to provide a press fit. A bush can also be provided in the housing 650 into which the first connecting portion 691 is pressed or screwed or adhered. A pin and/or bolt can also be provided in the housing, on which the first connecting portion 691 having a corresponding hollow portion is screwed or pressed or adhered.

The connecting device 690 has a collar 693 that presses the clamping part 651 to the housing 650 as soon as the connecting device 690 is attached to the housing 650 and the collar 693 hits the stop 653 to limit a further or deeper engagement of the connecting device 690 in the housing 650. To seal the housing 650 with respect to the clamping part 651 or the compensating chamber 660, the bellows 664 can be clamped by its edge (see, e.g., FIG. 14, reference sign 232) between the housing 650 and the clamping part 651. The compensating chamber 660 and the bellows 664 can be advantageously made as in the embodiment shown in FIGS. 11 to 17. This also applies to the other embodiments of master cylinders that are described in the present disclosure.

The connecting device 690 has a special tool engagement 695. The connecting device 690 can be attached to the housing by a special tool. The master cylinder, thus, can be sold to the final customer or user. The advantage with this is that an unintended wrong assembly can be prevented.

The connecting device 690 has a second connecting portion 694. The counterpiece 652 has recesses for receiving the second connecting portions 694. To attach the counterpart 652 to the connecting device 690, attachment nuts 696 are provided that are screwed onto the second connecting portion 694 in a way known to the person skilled in the art. In the connection between the counterpiece 652 and the clamping part 651 or the housing 650, the handlebar tube 688 is clamped between the clamping part 651 and the counterpiece 652.

The master cylinder 600 has a spring 613, which is preferably made as a yoke spring. The spring 613 biases the pressure piece 670 about the bolt 611 or the rotational point defined by the bolt 611 outwards with respect to the housing 650. The advantage with this is that the spring 613 drops the clearance for the user subjectively, i.e., the free travel between the bolt 612 and the sleeve 623 that the user has to travel upon actuation before the spindle 630 is displaced downwardly in the direction of the piston 640 upon actuation of the brake or clutch lever 610. In other words, the spring 613 biases the pressure piece 670 outwards such that the free travel between the bolt 612 and the sleeve 623 must be fully traveled in the actuation and the lever 610 or the pressure piece 670 does not "shake". At the same time, the spring 613 biases the pressure piece 670 with respect to the lever 610 or the handle width adjusting apparatus 620 arranged therein outwards and therefore there is also no clearance but the lever 610 always abuts against the pressure piece 670 via the handle width adjusting apparatus 620. The spring 613 thus has a dual function in so far as the spring 613 biases the pressure piece outwards (to create upon the actuation the free travel which defines the pressure point), on the one hand, and biases the pressure piece 670 with respect to the brake lever 610 outwards, on the other hand, to avoid a clearance in the handle width adjusting apparatus 620.

Alternatively to the shown yoke spring 613, it is also possible to provide another spring device that also forces the housing 650 away from the pressure piece 670 or biases them apart. For example, a compression spring can be disposed on a side opposite with respect to the rotational point or the bolt 612 of the spindle 630.

The embodiment of FIGS. 34, 36 and 37 also has the advantage that the handle width can be adjusted irrespective of the pressure point.

FIG. 35 shows a further embodiment of the invention, which substantially corresponds to the embodiment of FIG. 34. The corresponding parts are designated with equal reference signs that are increased by 100. Hereinafter, only the differences with respect to the embodiment of FIG. 34 are described and, as for the rest, reference is made to the description thereof.

The embodiment of FIG. 35 differs from the embodiment of FIG. 34 to the effect that only one handle width adjustment is provided while an adjustment of the pressure point is not provided. The handle width is achieved by turning the spindle 730 in the bolt 712. In the embodiment of FIG. 35, only the signal member 781 is shown. The sensor is not shown in this sectional view; it is provided in the housing 750 along with the signal element 781. The antiturn device of the piston 740 is achieved in the embodiment of FIG. 35 in that the piston 740 has a flattening 749 against which the pin 729 abuts when the piston is in its rest position. As a result, the piston is always returned to its initial position when in the rest position. Since no forces act on the piston in the circumferential direction, a turning of the piston can be prevented with sufficient reliability by this temporal orientation of the piston.

The following reference signs are used in the description of the exemplary embodiments:
51 clamping part
52 attachment portion
53 frame
54 opening
55 ridge
56 curvature
57 ridge
58 ridge
59 ventilation channel
60 ventilation channel
200 master cylinder
210 master cylinder
211 compensating chamber
211A compensating chamber portion
211B compensating chamber portion
211C compensating chamber portion
211D compensating chamber portion
212A compensating bore
212B compensating bore
212C compensating bore
212D compensating bore
213 ridge
214 rib
215 recess
220 piston chamber
222A opening of the compensating bore in the piston chamber
222B opening of the compensating bore in the piston chamber
222C opening of the compensating bore in the piston chamber
222D opening of the compensating bore in the piston chamber
230 bellows
231A projection
231B projection
231C projection
231D projection
232 edge
233 surface
234 bulge
300 master cylinder
310 lever or brake lever or clutch lever
311 fulcrum or bolt
312 bolt
313 spring
314 nut
320 actuation element
321 internal toothing
322 toothing
323 spring
330 spindle
331 ball head
332 collar
333 lower portion
334 upper portion
335 toothing
340 piston
341 support
342 gasket
343 gasket
344 spring
350 housing of the master cylinder
351 clamping part
352 counterpiece
353 filling opening
354 channel
360 compensating chamber
361 compensating chamber portion
362 compensating chamber portion
363 ridge
364 bellows
380 locking sleeve
381 toothing
382 external thread
400 master cylinder
410 lever or brake lever or clutch lever
411 fulcrum or bolt
420 adjusting apparatus for the handle width
421 turning button
422 spacer
423 collar
424 projection
425 flange
430 spindle
431 head
432 collar
433 sleeve
434 pin
435 tool engaging portion
436 free travel
440 piston
441 support
442 gasket
443 gasket
444 spring
450 housing
451 clamping part
452 counterpiece
453 filling opening
454 channel
460 compensating chamber
461 compensating chamber portion
462 compensating chamber portion
463 ridge
464 bellows
470 pressure piece
471 projection
472 projection
500 master cylinder
510 lever or brake lever or clutch lever
511 bolt or fulcrum
520 adjusting apparatus piston stop
521 stop part (with housing, rotationally fixed)
522 adjusting part (opposite to stop part 521, rotatory)
523 projection
524 actuating member
525 thread
526 thread
527 protrusion
529 pin
530 spindle
540 piston
541 support
542 gasket
543 gasket
544 spring
545 collar
550 housing 551 clamping part
552 counterpiece
553 filling opening
555 support
556 grating
557 collar
600 master cylinder
610 lever or brake lever or clutch lever
611 bolt or fulcrum
512 bolt
613 spring
620 adjusting apparatus
621 spacing member
622 actuation member
623 sleeve
629 pin
630 spindle
631 head
639 stop (e.g. collar)
640 piston
641 support
642 gasket
643 gasket
644 spring
649 flattening or area
650 housing
651 clamping part
652 counterpiece (e.g. clamp)
653 stop (for collar (693) of the connecting device 690)
660 compensating chamber
661 compensating chamber portion
662 compensating chamber portion
664 bellows
670 pressure piece
680 sensor device
681 magnet (e.g. bar magnet)
682 sensor (e.g. reed contact or Hall sensor)
688 handlebar tube
689 brake line
690 connecting device
691 stud
692 threaded portion (for attachment of the stud in the housing 650)
693 collar
694 threaded portion (for attachment of connecting means for attachment of the counterpiece 652 to the clamping part 651 or with the housing 650 to the handlebar tube 688)
695 special tool engagement
696 attachment nut
700 master cylinder
710 lever or brake lever or clutch lever
711 bolt or fulcrum
712 bolt
720 adjusting apparatus
721 tool engaging portion
729 pin
730 spindle
731 head
740 piston
741 support
742 gasket
743 gasket
744 spring
750 housing
751 clamping part
752 counterpiece
760 compensating chamber
764 bellows
780 sensor device
781 magnet It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The phrase "at least one of A and B" is used herein and/or in the following claims, where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A master cylinder for a hydraulic brake or clutch system of a vehicle steered by handlebars, comprising:
    a piston; and
    a housing:
        defining therein a piston chamber in which the piston is slidably accommodated;
        defining therein a pressure chamber;
        having an attachment portion shaped to attach to a handlebar tube; and
        defining therein a compensating chamber fluidically communicating with the pressure chamber through at least one compensating bore, the compensating chamber:
            defining a compensating volume;
            extending to the attachment portion;
            extending into the handlebar tube when the housing is attached to a handlebar tube; and
            having a separating member separating hydraulic fluid from the compensating volume and being within an opening in the handlebar tube and/or extending into the handlebar tube, wherein the attachment portion has a clamping part attaching the separating member to the attachment portion.

2. The master cylinder according to claim 1, wherein the attachment portion and the separating member clamp the separating member between the handlebar tube and the attachment portion when the master cylinder is attached to the handlebar tube.

3. The master cylinder according to claim 2, wherein:
the separating member has an edge; and
the attachment portion and the separating member clamp the separating member by the edge between the handlebar tube and the attachment portion when the master cylinder is attached to the handlebar tube.

4. The master cylinder according to claim 1, wherein:
the separating member is one of a gas-filled body, a compressible body, and a resiliently deformable body; and
the separating member is disposed in the compensating chamber and/or at the handlebar tube.

5. A master cylinder for a hydraulic brake or clutch system of a vehicle steered by handlebars, comprising:
a piston; and
a housing:
defining therein a piston chamber in which the piston is slidably accommodated;
defining therein a pressure chamber;
having an attachment portion shaped to attach to a handlebar tube; and
defining therein a compensating chamber fluidically communicating with the pressure chamber through at least one compensating bore, the compensating chamber:
defining a compensating volume;
extending to the attachment portion; and
having a separating member separating hydraulic fluid from the compensating volume, wherein the attachment portion has a clamping part attaching the separating member to the attachment portion, being a frame, and having at least one ridge.

6. The master cylinder according to claim 1, wherein the separating member is a bellows.

7. A master cylinder for a hydraulic brake or clutch system of a vehicle steered by handlebars, comprising:
a piston; and
a housing:
defining therein a piston chamber in which the piston is slidably accommodated;
defining therein a pressure chamber;
having an attachment portion shaped to attach to a handlebar tube; and
defining therein a compensating chamber fluidically communicating with the pressure chamber through at least one compensating bore, the compensating chamber:
defining a compensating volume;
extending to the attachment portion; and
having a separating member separating hydraulic fluid from the compensating volume, wherein the attachment portion has a clamping part attaching the separating member to the attachment portion and having at least one ventilation channel.

8. The master cylinder according to claim 1, further comprising:
a counterpiece for attaching the master cylinder to a handlebar tube; and at least one connecting device connecting the counterpiece to the housing of the master cylinder.

9. The master cylinder according to claim 8, wherein the at least one connecting device has:
a first connecting portion shaped to connect the clamping part to the housing of the master cylinder; and
a second connecting portion shaped to connect the counterpiece to the master cylinder and to attach the master cylinder to the handlebar tube.

10. The master cylinder according claim 9, further comprising a collar between the first connecting portion and the second connecting portion.

11. A master cylinder for a hydraulic brake or clutch system of a vehicle steered by handlebars, comprising:
a piston;
a housing:
defining therein a piston chamber in which the piston is slidably accommodated;
defining therein a pressure chamber;
having an attachment portion shaped to attach to a handlebar tube; and
defining therein a compensating chamber fluidically communicating with the pressure chamber through at least one compensating bore, the compensating chamber:
defining a compensating volume;
extending to the attachment portion; and
having a separating member separating hydraulic fluid from the compensating volume, wherein the attachment portion has a clamping part attaching the separating member to the attachment portion; and
at least one further compensating bore connecting the pressure chamber to the compensating chamber.

12. A master cylinder for a hydraulic brake or clutch system of a vehicle steered by handlebars, comprising:
a piston; and
a housing:
defining therein a piston chamber having a cylindrical wall in which the piston is slidably accommodated;
defining therein a pressure chamber;
having an attachment portion shaped to attach to a handlebar tube;
having a housing wall enclosing the cylindrical wall of the piston chamber; and
defining therein a compensating chamber fluidically communicating with the pressure chamber through at least one compensating bore, the compensating chamber:
defining a compensating volume;
extending to the attachment portion;
having a separating member separating hydraulic fluid from the compensating volume, wherein the attachment portion has a clamping part attaching the separating member to the attachment portion; and
between the cylindrical wall and the housing wall.

13. The master cylinder according to claim 12, wherein:
a wall of the housing defines the compensating chamber; and
at least one ridge and/or one rib is provided between the cylindrical wall confining the piston chamber and the wall defining the compensating chamber, the at least one ridge and/or one rib connects the wall defining the compensating chamber to the cylindrical wall of the piston chamber.

14. The master cylinder according to claim 12, wherein the compensating chamber at least partially encloses the cylindrical wall of the piston chamber.

15. The master cylinder according to claim 12, wherein the compensating chamber is divided in at least two sectors that are disposed laterally from the cylindrical wall confining the piston chamber.

16. A master cylinder for a hydraulic brake or clutch system of a vehicle steered by handlebars, comprising:
a piston;
a housing:
  defining therein a piston chamber in which the piston is slidably accommodated;
  defining therein a pressure chamber;
  having an attachment portion shaped to attach to a handlebar tube; and
  defining therein a compensating chamber fluidically communicating with the pressure chamber through at least one compensating bore, the compensating chamber:
    defining a compensating volume;
    extending to the attachment portion; and
    having a separating member separating hydraulic fluid from the compensating volume, wherein the attachment portion has a clamping part attaching the separating member to the attachment portion;
a brake lever having a pressure point and defining with the housing a handle width;
a spindle connecting the piston to the brake lever; and
an adjusting apparatus adjusting the handle width and the pressure point with an actuation element that adjusts the handle width in a first position and the pressure point in a second position.

17. A master cylinder for a hydraulic brake or clutch system of a vehicle steered by handlebars, comprising:
a piston;
a housing:
  defining therein a piston chamber in which the piston is slidably accommodated;
  defining therein a pressure chamber;
  having an attachment portion shaped to attach to a handlebar tube; and
  defining therein a compensating chamber fluidically communicating with the pressure chamber through at least one compensating bore, the compensating chamber:
    defining a compensating volume;
    extending to the attachment portion; and
    having a separating member separating hydraulic fluid from the compensating volume, wherein the attachment portion has a clamping part attaching the separating member to the attachment portion;
a lever having a pressure point and defining with the housing a handle width;
a pressure piece;
a spindle connecting the piston to the pressure piece; and
an adjusting apparatus:
  adjusting the handle width by changing an angle between the lever and the pressure piece;
  supporting itself on the pressure piece; and
  having a spacer supporting itself on the pressure piece and secured against rotation by the pressure piece.

18. A master cylinder for a hydraulic brake or clutch system of a vehicle steered by handlebars, comprising:
a piston has a limit stop;
a housing:
  defining therein a piston chamber in which the piston is slidably accommodated;
  defining therein a pressure chamber;
  having an attachment portion shaped to attach to a handlebar tube; and
  defining therein a compensating chamber fluidically communicating with the pressure chamber through at least one compensating bore, the compensating chamber:
    defining a compensating volume;
    extending to the attachment portion; and
    having a separating member separating hydraulic fluid from the compensating volume, wherein the attachment portion has a clamping part attaching the separating member to the attachment portion;
a lever;
a spindle connecting the piston to the lever; and
a pressure point adjusting apparatus permitting adjustment of the limit stop of the piston at the housing.

19. The master cylinder according to claim 18, wherein the pressure point adjusting apparatus has at least one of:
a stop member rotationally fixed to the housing and axially slidable with respect to the housing; and
an adjusting member rotatable with respect to the housing and having movement limited in an axial direction with respect to the cylinder.

20. The master cylinder of claim 1, wherein the vehicle is a bicycle.

* * * * *